US012139561B2

(12) United States Patent
Schubert et al.

(10) Patent No.: US 12,139,561 B2
(45) Date of Patent: Nov. 12, 2024

(54) POLYETHER-MODIFIED POLYBUTADIENES AND PROCESSES FOR PREPARATION THEREOF

(71) Applicant: Evonik Operations GmbH, Essen (DE)

(72) Inventors: Frank Schubert, Neukirchen-Vluyn (DE); Frauke Henning, Essen (DE); Sarah Otto, Essen (DE); Frank Dzialkowsky, Velbert-Langenberg (DE); Heike Hahn, Bochum (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/756,423

(22) PCT Filed: Nov. 23, 2020

(86) PCT No.: PCT/EP2020/083013
§ 371 (c)(1),
(2) Date: May 25, 2022

(87) PCT Pub. No.: WO2021/105037
PCT Pub. Date: Jun. 3, 2021

(65) Prior Publication Data
US 2023/0018204 A1  Jan. 19, 2023

(30) Foreign Application Priority Data

Nov. 28, 2019  (EP) ..................... 19212066

(51) Int. Cl.
C08C 19/40 (2006.01)
C08C 19/06 (2006.01)
C08G 59/02 (2006.01)
C08G 59/14 (2006.01)
C08G 59/34 (2006.01)
C08G 65/26 (2006.01)
C08G 81/02 (2006.01)

(52) U.S. Cl.
CPC ............ C08C 19/40 (2013.01); C08C 19/06 (2013.01); C08G 59/027 (2013.01); C08G 59/1444 (2013.01); C08G 59/34 (2013.01); C08G 65/2609 (2013.01); C08G 2650/24 (2013.01)

(58) Field of Classification Search
None
See application file for complete search history.

(56) References Cited

U.S. PATENT DOCUMENTS

| 4,268,433 | A | * | 5/1981 | Sawatari | ................. | C08K 5/34 |
| | | | | | | 525/193 |
| 4,283,313 | A | | 8/1981 | Omika et al. | | |
| 4,900,544 | A | | 2/1990 | Ritter et al. | | |
| 4,994,621 | A | | 2/1991 | Yeakey et al. | | |
| 5,093,424 | A | * | 3/1992 | Morita | ................. | C09D 115/00 |
| | | | | | | 525/930 |
| 10,087,266 | B2 | | 10/2018 | Haberkorn et al. | | |
| 2015/0307640 | A1 | | 10/2015 | Berlineanu et al. | | |
| 2016/0311949 | A1 | | 10/2016 | Haberkorn et al. | | |
| 2018/0037693 | A1 | | 2/2018 | Eling et al. | | |

FOREIGN PATENT DOCUMENTS

| CN | 101538338 | | 9/2009 |
| DE | 29 43 879 | | 5/1980 |
| DE | DD206 286 | | 1/1984 |
| DE | 33 05 964 | | 8/1984 |
| DE | 34 42 200 | | 5/1986 |
| DE | DD253 627 | | 1/1988 |
| EP | 0 351 135 | | 1/1990 |
| EP | 2 003 156 | | 12/2008 |
| EP | 2 805 981 | | 11/2014 |
| EP | 2 805 982 | | 11/2014 |
| JP | S53-117030 | | 10/1978 |
| JP | 2002-105209 | | 4/2002 |
| JP | 2002105209 | A * | 4/2002 |
| JP | 2004-346310 | | 12/2004 |
| JP | 2011-38003 | | 2/2011 |
| WO | 2014/001300 | | 1/2014 |
| WO | 2016/142249 | | 9/2016 |

OTHER PUBLICATIONS

U.S. Pat. No. 10,087,266, Oct. 2, 2018, 2016/0311949, Haberkorn et al.
European Search Report dated Jun. 8, 2020 in European Patent Application No. 19212066.5, 7 pages.
Gao et al., "Facile Synthesis of Amphiphilic Heterografted Copolymers with Crystalline and Amorphous Side Chains", Macromolecular Chemistry and Physics. vol. 214, 2013, pp. 1677-1687.
International Search Report dated Feb. 5, 2021 in PCT/EP2020/083013, with English translation, 8 pages.
Written Opinion dated Feb. 5, 2021 in PCT/EP2020/083013, with English translation, 9 pages.

(Continued)

Primary Examiner — Randy P Gulakowski
Assistant Examiner — Ha S Nguyen
(74) Attorney, Agent, or Firm — Grüneberg and Myers PLLC

(57) ABSTRACT

A process can be used for preparing polyether-modified polybutadienes. The process involves reacting at least one polybutadiene (A) with at least one epoxidizing reagent (B) to give at least one epoxy-functional polybutadiene (C). The at least one epoxy-functional polybutadiene (C) is then reacted with at least one hydroxy-functional compound (D) to give at least one hydroxy-functional polybutadiene (E). The at least one hydroxy-functional polybutadiene (E) is finally reacted with at least one epoxy-functional compound (F) to give at least one polyether-modified polybutadiene (G).

23 Claims, No Drawings

(56) References Cited

OTHER PUBLICATIONS

Lobert et al., U.S. Appl. No. 18/564,035, filed Nov. 24, 2023.
U.S. Appl. No. 18/564,035, filed Nov. 24, 2023, Lobert et al.
Schubert et al., U.S. Appl. No. 18/546,541, filed Aug. 15, 2023.
U.S. Appl. No. 18/546,541, filed Aug. 15, 2023, Schubert et al.
Lobert et al., U.S. Appl. No. 18/563,143, filed Nov. 21, 2023.
U.S. Appl. No. 18/563,143, filed Nov. 21, 2023, Lobert et al.

* cited by examiner

POLYETHER-MODIFIED POLYBUTADIENES AND PROCESSES FOR PREPARATION THEREOF

CROSS-REFERENCE TO RELATED APPLICATIONS

This application is the National Stage entry under § 371 of International Application No. PCT/EP2020/083013, filed on Nov. 23, 2020, and which claims the benefit of priority to European Application No. 19212066.5, filed on Nov. 28, 2019. The content of each of these applications is hereby incorporated by reference in its entirety.

BACKGROUND OF THE INVENTION

Field of the Invention

The present invention relates to a process for preparing polyether-modified polybutadienes and to polyether-modified polybutadienes preparable by this process, wherein the process comprises the following steps:
  a) reacting at least one polybutadiene (A) with at least one epoxidizing reagent (B) to give at least one epoxy-functional polybutadiene (C);
  b) reacting the at least one epoxy-functional polybutadiene (C) with at least one hydroxy-functional compound (D) to give at least one hydroxy-functional polybutadiene (E):
  c) reacting the at least one hydroxy-functional polybutadiene (E) with at least one epoxy-functional compound (F) to give at least one polyether-modified polybutadiene (G).

The polyether-modified polybutadienes according to the invention are thus obtainable by direct alkoxylation of pendant hydroxy-functional polybutadienes and have polyether radicals in pendant (comb) positions.

Description of Related Art

Polybutadienes having pendant polyether radicals are known and are prepared according to the prior art, for example, by a reaction of reactive functionalized polybutadienes with polyethers. For instance, Q. Gao et al. in Macromolecular Chemistry and Physics (2013), 214(15). 1677-1687 describe amphiphilic polymer comb structures that are prepared by grafting polyethylene glycol onto a main polybutadiene chain. According to JP 2011038003, polybutadienes functionalized with maleic anhydride units are reacted with amino-terminated polyethers. The result is maleinized polybutadienes having polyether radicals in comb positions, attached via an amide or imide group. In a similar process, according to J. Wang, Journal of Applied Polymer Science (2013), 128(4), 2408-2413, polyethylene glycols are added onto polybutadienes having a high proportion of 1,2-butadiene monomer units to form an ester linkage. High molecular weight graft polymers having comb structure are obtained by the process disclosed in JP 2002105209 by an addition of epoxidized polybutadienes with OH-functional polyethers. H. Decher et al., according to Polymer International (1995), 38(3), 219-225, use the addition of isocyanate-terminated polyethylene glycols onto hydroxy-functional polybutadienes.

Also known are processes for preparing polyether-modified polybutadienes in which hydroxy-functional polybutadienes are reacted with epoxy compounds. For example, the prior art discloses the alkoxylation of OH-terminated polybutadienes.

U.S. Pat. No. 4,994,621 A describes, for example, the alkoxylation of hydroxy-terminated polybutadienes with ethylene oxide and propylene oxide in the presence of tetramethylammonium hydroxide. EP 2003156 A1 states that the alkali-catalysed alkoxylation of OH-terminated polybutadienes is barely possible for structural reasons and as a result of the poor solubility of alkaline catalysts, and instead prefers double metal cyanide (DMC) catalysis. The use of OH-terminated polybutadienes in alkoxylation leads exclusively to polyether-polybutadiene-polyether triblock structures. According to EP 2003158 A1, this block structure is responsible for the poor miscibility with other reaction components in the preparation of polyurethanes.

As well as the alkoxylation of OH-terminated polybutadienes, the alkoxylation of pendantly hydroxy-functional polybutadienes is also known. For Instance, Q. Gao et al. In Macromolecular Chemistry and Physics (2013), 214(15), 1677-1687 describe the preparation of a pendantly polyether-modified polybutadiene by alkoxylation of a pendantly hydroxy-functional polybutadiene with ethylene oxide. The pendantly hydroxy-functional polybutadiene used here is prepared first by epoxidation of a polybutadiene, followed by reaction of the epoxidized polybutadiene with a lithium-polybutadiene compound, and finally protonation of the reaction product with methanolic HCl. This process leads to a polybutadiene having both pendant polyether radicals and pendant polybutadiene radicals. Since there is always a polybutadiene radical for every polyether radical here, this process leads to polyether-modified polybutadienes having low HLB values (HLB~hydrophilic lipophilic balance). Moreover, the polyether-modified polybutadienes are branched in the polybutadiene moiety. Polyether-modified polybutadienes having higher HLB values and/or an unbranched polybutadiene moiety are not preparable by this process. A further disadvantage of the process is the use of organometallic compounds (n-BuLi and lithium-polybutadiene), which places particular demands on the process regime owing to their high air and moisture sensitivity. This makes it difficult to implement this process industrially. The prior art to date has not disclosed any process for preparing preferably linear polybutadienes having pendant polyether chains by a simple direct alkoxylation reaction of pendantly hydroxy-functional polybutadienes with alkylene oxides, wherein the pendantly hydroxy-functional polybutadienes are prepared from epoxy-functional polybutadienes without use of organometallic compounds such as lithium-polybutadiene. In summary, it can be stated that the prior art to date has not disclosed any process for preparing linear polybutadienes with polyether chains in comb positions by a simple, direct alkoxylation reaction with alkylene oxides.

The chemical modification of polybutadiene with the aid of epoxidation and further reactions is known from the literature. The epoxy ring opening usually takes place by a reaction with amines. JP 53117030 and DE 2943879 describe the addition of ethanolamine or diethanolamine, EP 351135 and DE 3305964 the reaction of the epoxy groups with dimethylamine. DD 206286 discloses the addition of primary and secondary amines having 4 to 20 carbon atoms onto epoxidized polybutadienes in polar solvents. Also known is the modification of polybutadiene with fatty acids. For instance, DE 3442200 describes the addition of $C_6$-$C_{22}$ carboxylic acids onto epoxidized polybutadiene. No further alkoxylation of the reaction products is disclosed in these documents.

Amine-functional polybutadienes are not very suitable as starter compounds for the alkoxylation in the context of the present invention since they impart an often undesirable basic character to the products, cause discoloration or, for example, inhibit alkoxylation catalysts such as double metal cyanides.

According to the prior art, the addition of alcohols and water onto epoxidized polybutadiene seems to be far more difficult than the addition of amines and carboxylic acids. Qing Gao et al., in J. Macromol. Sci., Part A: Pure and Applied Chemistry (2013), 50, 297-301, describe the trifluoromethanesulfonic acid-catalysed addition of water onto epoxidized polybutadienes in THF. The aim of WO 2016/142249 A1 is the preparation of vitreous polymers by addition of water or alcohols having 1 to 4 carbon atoms onto the epoxy groups of polybutadiene, and is limited to the preparation of OH-functional polybutadienes having low molar masses of 300 to 2000 g/mol and a high content of 50% to 80% of 1,2-vinylic and 1,2-cyclovinylic double bonds.

Polybutadienes and modified polybutadienes are in many cases used as reactive component or formulation constituent in order, for example, to render polymers hydrophobic or to flexibilize them and improve mechanical properties. At present, however, there are frequently limits to the possible uses of alkoxylated polyether-modified polybutadienes as a result of the restriction to a small number of available triblock structures. There has hitherto been no way of varying the chemical makeup of the polyether-modified polybutadienes within broad limits. Moreover, there is no simple preparation process for such polymers.

SUMMARY OF THE INVENTION

The object of the present invention was that of overcoming at least one disadvantage of the prior art.

A particular problem addressed was that of providing an improved process for preparing preferably linear polybutadienes modified with polyether radicals in comb (pendant) positions. The process should also enable very simple access in terms of process technology to preferably linear polybutadienes having pendant polyether radicals, and be performable, for example, without use of organolithium compounds. The polyether-modified polybutadienes should at the same time also be obtainable by direct alkoxylation of pendantly hydroxy-functional polybutadienes. An additional problem addressed here was that of providing improved pendantly hydroxy-functional polybutadienes as precursors and chain starters for alkoxylation in the process.

It has now been found that, surprisingly, this problem is solved by a process for preparing polyether-modified polybutadienes that comprises the following steps:
 a) reacting at least one polybutadiene (A) with at least one epoxidizing reagent (B) to give at least one epoxy-functional polybutadiene (C);
 b) reacting the at least one epoxy-functional polybutadiene (C) with at least one hydroxy-functional compound (D) to give at least one hydroxy-functional polybutadiene (E);
 c) reacting the at least one hydroxy-functional polybutadiene (E) with at least one epoxy-functional compound (F) to give at least one polyether-modified polybutadiene (G).

It has further been found that, surprisingly, polybutadienes having a high proportion of 1,4 units and a low content of vinylic 1,2 units, after epoxidation with hydrogen peroxide, can readily be reacted under acid-catalysed ring-opening with OH-functional compounds to give pendantly OH-functional polybutadienes (polybutadienols) and can then be alkoxylated with alkylene oxides.

The problem addressed by the present invention is therefore solved by the subject-matter as described below. Advantageous configurations of the invention are specified in the examples and the description further below.

DETAILED DESCRIPTION OF THE INVENTION

The subject-matter of the invention is described by way of example below but without any intention that the invention be restricted to these illustrative embodiments. Where ranges, general formulae or classes of compounds are specified below, these are intended to encompass not only the corresponding ranges or groups of compounds which are explicitly mentioned but also all subranges and subgroups of compounds which can be obtained by removing Individual values (ranges) or compounds. Where documents are cited in the context of the present description, the entire content thereof is intended to be part of the disclosure content of the present invention.

Where average values are reported hereinafter, these values are numerical averages unless stated otherwise. Where measurement values, parameters or material properties determined by measurement are reported hereinafter, these are, unless stated otherwise, measurement values, parameters or material properties which are measured at 25° C. and also preferably at a pressure of 101 325 Pa (standard pressure).

Where numerical ranges in the form "X to Y" are reported hereinafter, where X and Y represent the limits of the numerical range, this is synonymous with the statement "from at least X up to and including Y", unless stated otherwise. Statements of ranges thus include the range limits X and Y, unless stated otherwise.

Wherever molecules/molecule fragments have one or more stereocentres or can be differentiated into isomers on account of symmetries or can be differentiated into isomers on account of other effects, for example restricted rotation, all possible isomers are included by the present invention.

The formulae (1) to (5) below describe compounds or radicals that are constructed from repeat units, for example repeat fragments, blocks or monomer units, and can have a molar mass distribution. The frequency of the repeat units is reported by indices. The indices used in the formulae should be regarded as statistical averages (numerical averages). The indices used and also the value ranges of the reported indices should be regarded as averages of the possible statistical distribution of the structures that are actually present and/or mixtures thereof. The various fragments or repeat units of the compounds described in the formulae (1) to (5) below may be distributed statistically. Statistical distributions are of blockwise construction with any desired number or blocks and with any desired sequence or are subject to a randomized distribution; they may also have an alternating construction or else form a gradient over the chain, where one is present; in particular they can also form all mixed forms in which groups with different distributions may optionally follow one another. The formulae below include all permutations of repeat units. Where compounds such as polybutadienes (A), epoxy-functional polybutadienes (C), hydroxy-functional polybutadienes (E), polyether-modified polybutadienes (G) or polyether-modified polybutadienes (K) containing end-capped polyether radicals, for example, that can have multiple instances of different units are described in the context of the present invention, these may thus occur in these compounds either in an unordered manner, for example in statistical distribution, or in an ordered manner. The FIGS. for the number or relative frequency of units in such compounds should be regarded as an average (numerical average) over all the corresponding compounds. Specific embodiments may lead to restrictions of the statistical distributions as a result of the embodiment. For all regions unaffected by such restriction, the statistical distribution is unchanged.

The invention thus firstly provides a process for preparing one or more polyether-modified polybutadienes, comprising the steps of:
  a) reacting at least one polybutadiene (A) with at least one epoxidizing reagent (B) to give at least one epoxy-functional polybutadiene (C);
  b) reacting the at least one epoxy-functional polybutadiene (C) with at least one hydroxy-functional compound (D) to give at least one hydroxy-functional polybutadiene (E);
  c) reacting the at least one hydroxy-functional polybutadiene (E) with at least one epoxy-functional compound (F) to give at least one polyether-modified polybutadiene (G).

It is preferable that the process according to the invention also comprises at least one of the following optional steps:
  d) reacting the at least one polyether-modified polybutadiene (G) with at least one end-capping reagent (H) to give at least one polyether-modified polybutadiene (K) containing end-capped polyether radicals;
  e) lightening the colour of the at least one polyether-modified polybutadiene (G) or (K).

The process is preferably further characterized in that
  in step a) >0% to 70%, preferably 1% to 50%, further preferably 2% to 40%, even further preferably 3% to 30% and especially preferably 4% to 20%, of the double bonds of the at least one polybutadiene (A) are epoxidized with the aid of performic acid which is produced in situ from formic acid and $H_2O_2$;
  in step b) one or more short-chain alcohols having 1 to 6 carbon atoms, especially isobutanol, are added onto the epoxy groups of the at least one epoxy-functional polybutadiene (C) under ring opening, preferably using one or more acidic catalysts, especially trifluoromethanesulfonic acid;
  in step c) one or more epoxy-functional compounds (F) selected from alkylene oxides and optionally further epoxy-functional monomers are added onto the resultant pendant OH groups of the at least one hydroxy-functional polybutadiene (E) in an alkoxylation reaction, preferably additionally using a Zn/Co double metal cyanide catalyst or basic catalysts such as amines, guanidines, amidines, alkali metal hydroxides or alkali metal alkoxides;
  in step d) the at least one polyether-modified polybutadiene (G) Is optionally reacted with at least one end-capping reagent (H) selected from the group of carboxylic acids, carboxylic anhydrides, halogenated hydrocarbons, isocyanates and carbonates to give at least one polyether-modified polybutadiene (K) containing end-capped polyether radicals;
  in step e) lightening of the colour of the at least one polyether-modified polybutadiene (G) or (K) is optionally undertaken with activated carbon and/or hydrogen peroxide.

The process according to the invention makes it possible for the first time to modify linear polybutadienes by a simple direct alkoxylation on the pendant OH groups with polyether radicals in comb positions. The chain length and monomer sequence in the polyether radical may be varied within wide ranges. The average number of polyether radicals bonded to the polybutadiene is adjustable in a controlled manner via the degree of epoxidation and the hydroxy functionalization, and opens up a great structural variety in the hydroxy-functional polybutadienes (E).

The grafting of polyethers onto polybutadiene known in the prior art is rarely quantitative in practice, and the reaction products typically contain free proportions of polyethers and possibly unfunctionalized polybutadienes. The above-described addition of OH-functional polyethers via their OH group onto epoxidized polybutadienes is likewise usually incomplete, and the products contain residual unconverted epoxy groups. If the polyethers are used in excess, it is possible to reduce the residual content of epoxy groups, but the excess polyethers remain in the product since they cannot be removed by distillation.

The polybutadienes having polyether radicals in comb positions that are obtainable in accordance with the invention are preferably essentially free of residual epoxy groups. The process product according to the Invention preferably contains essentially no free polyether components. Preferably, essentially all polyethers are chemically attached to the polybutadiene via an ether bond. The process products according to the invention are thus distinctly different from the compounds known today from the prior art by virtue of their elevated purity.

The Preferred Configuration of Step a) of the Process According to the Invention:

In step a) of the process according to the invention, the at least one polybutadiene (A) is reacted with at least one epoxidizing reagent (B) to give at least one epoxy-functional polybutadiene (C).

In this reaction, double bonds of the polybutadiene (A) are converted to epoxy groups. Various methods of epoxidizing polybutadienes, for example with percarboxylic acids and hydrogen peroxide, are known to the person skilled in the art and are disclosed, for example, in CN 101538338, JP 2004346310, DD 253627 and WO 2016/142249 A1. Performic acid is particularly suitable for preparation of the epoxy-functional polybutadienes (C) having a high proportion of 1,4 units, and can be formed in situ from formic acid in the presence of hydrogen peroxide. The epoxidation preferably takes place in a solvent such as toluene or chloroform, which is removed by distillation after the reaction and after the washing-out of any peroxide residues.

The polybutadienes (A) are polymers of buta-1,3-diene. The polymerization of the buta-1,3-diene monomers is effected essentially with 1,4 and/or 1,2 linkage. 1,4 linkage leads to what are called 1,4-trans units and/or 1,4-cis units, which are also referred to collectively as 1,4 units. 1,2 linkage leads to what are called 1,2 units. The 1,2 units bear a vinyl group and are also referred to as vinylic 1,2 units. In the context of the present invention, the 1,2 units are also referred to as "(X)", the 1,4-trans units as "(Y)", and the 1,4-cis units as "(Z)":

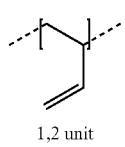

(X)

1,2 unit

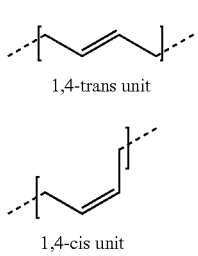

(Y) 1,4-trans unit

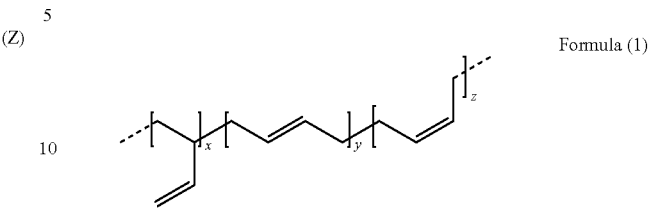

(Z) 1,4-cis unit

The double bonds present in the units are referred to analogously as 1,4-trans double bonds, 1,4-cis double bonds, or as 1,2 double bonds or 1,2 vinyl double bonds. The 1,4-trans double bonds and 1,4-cis double bonds are also referred to collectively as 1.4 double bonds.

The polybutadienes (A) are thus unmodified polybutadienes. The polybutadienes (A) and their preparation processes are known to the person skilled in the art. Preparation is preferably effected by means of a free-radical, anionic or coordinative chain polymerization.

Free-radical chain polymerization is preferably conducted as an emulsion polymerization. This leads to statistical occurrence of the three units mentioned. In the case of a low reaction temperature (about 5° C.), there is a fall in the proportion of vinyl groups. Initiation is preferably effected with potassium peroxodisulfate and iron salts, or else with hydrogen peroxide.

In anionic chain polymerization, the chain polymerization Is preferably initiated with butyllithium. The polybutadlene (A) thus obtained contains about 40% 1,4-cis units and 50% 1,4-trans units.

In the case of coordinative chain polymerization, preference is given to using Ziegler-Natta catalysts, especially stereospecific Ziegler-Natta catalysts, that lead to a polybutadiene (A) having a high proportion of 1,4-cis units.

The polymerization of 1,3-butadiene, as well as side reactions or further reactions, for example a further reaction of the double bonds of the resulting 1,2 and 1,4 units of the polybutadiene, may also result in branched polybutadienes (A). However, the polybutadienes (A) used in accordance with the invention are preferably linear, i.e. unbranched, polybutadienes. It is also possible that the polybutadienes include small proportions of units other than 1,2 units, 1,4-trans units or 1,4-cis units. However, it Is preferable that the proportion by mass of the sum total of 1,2 units, 1,4-trans units and 1,4-cis units Is at least 80%, preferably at least 90%, especially at least 99%, based on the total mass of the at least one polybutadlene (A), i.e. based on the total mass of all polybutadienes (A) used.

For the process according to the Invention, preference Is given to using those polybutadienes (A) that have 0% to 80% 1,2 units and 20% to 100% 1,4 units, preferably 0% to 30% 1,2 units and 70% to 100% 1,4 units, especially preferably 0% to 10% 1,2 units and 90% to 100% 1,4 units, and most preferably 0% to 5% 1,2 units and 95% to 100% 1,4 units, based on the sum total of 1,2 units and 1,4 units.

It is thus preferable that, of the double bonds of all the polybutadienes (A) used, 0% to 80% are 1,2 vinyl double bonds and 20% to 100% are 1,4 double bonds, preferably 0% to 30% are 1,2 vinyl double bonds and 70% to 100% are 1,4 double bonds, especially preferably 0% to 10% are 1,2 vinyl double bonds and 90% to 100% are 1,4 double bonds, most preferably 0% to 5% are 1,2 vinyl double bonds and 95% to 100% are 1,4 double bonds.

For the Inventive preparation of the products, accordingly, preference Is given to using polybutadienes (A) of the formula (1)

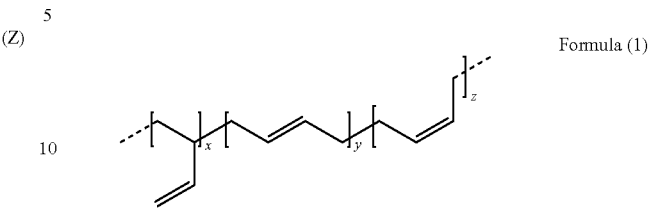

Formula (1)

having a content of 0% to 80% 1,2 vinyl double bonds (index x) and 20% to 100% 1,4 double bonds (sum total of the indices y and z), preferably 0% to 30% 1,2 vinyl double bonds and 70% to 100% 1,4 double bonds, especially preferably having 0% to 10% 1,2 vinyl double bonds and 90% to 100% 1,4 double bonds, most preferably having 0% to 5% 1,2 vinyl double bonds and 95% to 100% 1.4 double bonds. The ratio of 1,4-trans double bonds (index y) and 1,4-cis double bonds (index z) is freely variable.

The indices x, y and z give the number of the respective butadiene unit in the polybutadiene (A). The Indices are numerical averages (number averages) over the entirety of all polybutadiene polymers of the at least one polybutadlene (A).

The average molar mass and polydispersity of the polybutadienes (A) of formula (1) used is freely variable.

It is preferable that the number-average molar mass $M_n$ of the at least one polybutadlene (A) Is from 200 g/mol to 20 000 g/mol, preferably from 500 g/mol to 10 000 g/mol, more preferably from 700 g/mol to 5000 g/mol.

Alternatively, it Is preferable that the number-average molar mass $M_n$ of the at least one polybutadlene (A) is from 2100 g/mol to 20 000 g/mol, more preferably from 2200 g/mol to 10 000 g/mol, most preferably from 2300 g/mol to 5000 g/mol.

In the context of the present invention, number-average molar mass $M_n$, weight-average molar mass $M_w$ and polydispersity ($M_w/M_n$) are preferably determined by means of gel permeation chromatography (EPC) as described in the examples.

It is further preferable that the at least one polybutadlene (A) has a numerical average of 5 to 380, preferably 10 to 180, most preferably 15 to 90, units selected from the group consisting of 1,2 units, 1,4-cis units and 1,4-trans units.

Alternatively, it is preferable that the at least one polybutadiene (A) has a numerical average of 35 to 380, preferably 40 to 180, most preferably 45 to 90, units selected from the group consisting of 1.2 units, 1,4-cis units and 1,4-trans units.

It is further preferable that the viscosity of the polybutadienes (A) used is 50 to 50 000 mPas, preferably 100 to 10 000 mPas, especially 500 to 5000 mPas (determined to DIN EN ISO 3219:1994-10).

Polybutadienes used with particular preference are the commercially available Polyvest® 110 and Polyvest® 130 products from Evonik Industries AG/Evonik Operations GmbH, having the following typical indices:

Polyvest® 110: about 1% 1,2 vinyl double bonds, about 24% 1,4-trans double bonds, about 75% 1,4-cis double bonds, number-average molar mass $M_n$ about 2600 g/mol, viscosity (20° C.) 700-860 mPas (to DIN EN ISO 3219: 1994-10).

Polyvest® 130: about 1% 1,2 vinyl double bonds, about 22% 1,4-trans double bonds, about 77% 1,4-cis double bonds, number-average molar mass $M_n$ about 4600 g/mol, viscosity (20° C.) 2700-3300 mPas (to DIN EN ISO 3219: 1994-10).

Polybutadienes used with particular preference are also the Lithene ultra AL and Lithene ActiV 50 products available from Synthomer PLC, having the following typical characteristic data:

Lithene ultra AL: about 40% 1,2-vinyl double bonds, about 60% 1,4 double bonds,

Lithene ActiV 50: about 70% 1,2 vinyl double bonds, about 30% 1,4 double bonds.

The degree of epoxidation is determined quantitatively, for example, with the aid of $^{13}C$ NMR spectroscopy or epoxy value titration (determinations of the epoxy equivalent according to DIN EN ISO 3001:1999), and can be adjusted in a controlled and reproducible manner via the process conditions, especially via the amount of hydrogen peroxide used in relation to the amount of double bonds in the initial charge of polybutadiene.

It Is preferable that, in step a) of the process according to the Invention. >0% to 70%, preferably 1% to 50%, further preferably 2% to 40%, even further preferably 3% to 30% and especially preferably 4% to 20% of all double bonds of the at least one polybutadiene (A) are epoxidized.

Usable epoxidizing reagents (B) are in principle all epoxidizing agents known to the person skilled in the art. It is preferable that the epoxidizing reagent (B) is selected from the group of the peroxycarboxylic acids (percarboxylic acids, peracids), preferably from the group consisting of meta-chloroperbenzoic acid, peroxyacetic acid (peracetic acid) and peroxyformic acid (performic acid), especially peroxyformic acid (performic acid). The peroxycarboxylic acids are preferably formed in situ from the corresponding carboxylic acid and hydrogen peroxide.

It is particularly preferable that the at least one epoxidizing reagent (B) contains performic acid which Is preferably formed in situ from formic acid and hydrogen peroxide.

The epoxidation of the at least one polybutadiene (A) takes place preferentially at the 1,4 double bonds in a statistical distribution over the polybutadiene chain. Epoxidation of the 1,2 double bonds can likewise take place, and likewise takes place in statistical distribution over the polybutadiene chain at these bonds. However, epoxidation of the 1,2 double bonds is less favoured compared to epoxidation of the 1,4 double bonds. The reaction product thus contains epoxy-functional polybutadiene polymers that differ from one another in their degree of epoxidation. All the degrees of epoxidation stated should therefore be regarded as averages.

It is further preferable, during the process according to the invention, to stabilize the reactants, intermediates and products using stabilizers or antioxidants in order to avoid unwanted polymerization reactions of the double bonds. Suitable for this purpose are, for example, the sterically hindered phenols known to those skilled in the art, commercially available, for example, as Anox® 20, Irganox® 1010 (BASF), Irganox® 1076 (BASF) and Irganox® 1135 (BASF). It is further preferable to conduct the overall preparation process under an inert atmosphere, for example under nitrogen. The unmodified reactants, i.e. the at least one polybutadiene (A) and also the polyether-modified finished products according to the invention, i.e. the at least one polyether-modified polybutadiene (G) or (K), should also preferably be stored as far as possible with exclusion of air.

The Preferred Configuration of Step b) of the Process According to the Invention:

In step b) of the process according to the invention, the at least one epoxy-functional polybutadiene (C) is reacted with at least one hydroxy-functional compound (D) to give at least one hydroxy-functional polybutadiene (E).

In this reaction, an addition (addition reaction) of the at least one hydroxy-functional compound (D) onto the at least one epoxy-functional polybutadiene (C) takes place. The reaction Is thus effected with formation of one or more covalent bonds between the at least one hydroxy-functional compound (D) and the at least one epoxy-functional polybutadiene (C). The reaction preferably comprises (at least in Idealized form) a reaction step in which there is a nucleophilic attack of at least one hydroxyl group of the at least one hydroxy-functional compound (D) on at least one epoxy group of the at least one epoxy-functional polybutadiene (C) with ring opening of this at least one epoxy group.

In principle, in the context of the process according to the Invention, all compounds having at least one hydroxyl group can be added onto the epoxy groups of the polybutadiene. Hydroxy-functional compounds (D) may be selected, for example, from the group consisting of alcohols, carboxylic acids and water. Preference is given to selecting the at least one hydroxy-functional compound (D) from the group of the monofunctional alcohols having 1 to 6 carbon atoms, further preferably from the group of the monofunctional alcohols having 2 to 4 carbon atoms, more preferably from the group consisting of ethanol, 1-propanol, isopropanol, 1-butanol, 2-butanol and isobutanol. It is also possible here to use any desired mixtures of these alcohols. However, it is especially preferable that the hydroxy-functional compound (D) used is not methanol. Another suitable hydroxy-functional compound (D) is water. Water may be used alone or in a mixture with one or more other hydroxy-functional compounds (D). For example, it is possible to use mixtures of alcohol and water or mixtures of carboxylic acid and water in step b). It is thus unnecessary to dry the at least one hydroxy-functional compound (D), for example alcohol or carboxylic acid, and to free it of water.

The molar ratio of the OH groups of the hydroxy-functional compound (D) to the epoxy groups of the epoxy-functional polybutadiene (C) may be varied within a wide range. However, it is preferable to use the hydroxy-functional compounds (D) in a stoichiometric excess based on the stoichiometric ratio of hydroxyl groups to the epoxy groups of the epoxy-functional polybutadiene (C), in order to achieve quantitative conversion of all epoxy groups. It is therefore preferable that, in step b), the total number of hydroxyl groups in all the hydroxy-functional compounds (D) to the total number of epoxy groups in all the epoxy-functional polybutadienes (C) is from >1:1 to 50:1, further preferably from 2:1 to 35:1, even further preferably 3:1 to 30:1, especially preferably from 3:1 to 25:1. The excess of compound (D) may be removed, for example by distillation, after the reaction and be reused if required.

In a preferred embodiment, the reaction takes place in the presence of at least one acidic catalyst. The catalyst is optionally homogeneously soluble in the reaction mixture or distributed heterogeneously in solid form therein, for example sulfonic acid ion exchangers. In the context of the invention, preference is given to catalysts such as sulfuric acid, sulfonic acids and trifluoroacetic acid, more preferably trifluoromethanesulfonic acid. It is thus preferable that, in step b), an acid, further preferably sulfuric acid, sulfonic acids and/or trifluoroacetic acid, especially preferably trifluoromethanesulfonic acid, is used as catalyst.

The type of acid and the amount used are chosen so as to achieve very rapid and quantitative addition of the at least one hydroxy-functional compound (D) onto the epoxy groups of the at least one epoxy-functional polybutadiene (C). Preference is given to using trifluoromethanesulfonic acid in a concentration of 1 ppmw to 1000 ppmw (ppmw=ppm by mass), more preferably in a concentration of 50 ppmw to 300 ppmw, based on the reaction mixture.

The reaction of the at least one epoxy-functional polybutadiene (C) with the at least one hydroxy-functional compound (D) in the presence of an acidic catalyst preferably takes place within the temperature range from 20° C. to 120° C., and is limited at the upper end by the boiling point of the hydroxy-functional compound (D) or, when multiple hydroxy-functional compounds (D) are used, by the boiling point of the most volatile hydroxy-functional compound (D). Preference is given to conducting the reaction at 50° C. to 90° C. The components are stirred for a few hours until the epoxy groups have been as far as possible fully converted. The analysis for epoxy groups can be effected either by NMR spectroscopy analysis or by known methods of epoxy value titration (as described in the examples). The reaction conditions in step b) are preferably chosen such that more than 97% of the epoxy groups generated in step a) are converted under ring opening. It Is especially preferable that no epoxy groups are detectable any longer in the product from step b), i.e. In the at least one hydroxy-functional polybutadiene (E).

After the reaction, the acidic reaction mixture is neutralized. For this purpose, it is possible in principle to add any basic neutralizing agent. Preference is given to conducting neutralization with sodium hydrogencarbonate, in solid form or as an aqueous solution. Any excess hydroxy-functional compounds (D) and any water are preferably removed by distillation and precipitated salts are filtered off if required. Preference is given here to the use of aqueous sodium hydrogencarbonate solution since lighter-coloured products are thus obtained.

Each epoxy group in an epoxy-functional polybutadiene (C), after ring opening by a hydroxy-functional compound (D) of the formula A-OH, results in a repeat unit of the formula (2a), (2b) or (2c):

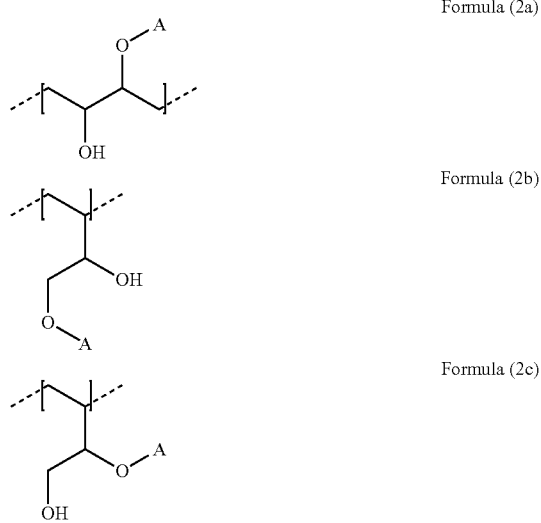

Formula (2a)

Formula (2b)

Formula (2c)

A here is preferably a monovalent organic radical that may also bear further hydroxyl groups, or a hydrogen radical. If, for example, a monofunctional aliphatic alcohol having 1 to 6 carbon atoms is used as hydroxy-functional compound (D), A is an alkyl radical having 1 to 6 carbon atoms. In the case of water as hydroxy-functional compound (D), A is a hydrogen radical, i.e. A=H. If, for example, a carboxylic acid is used as hydroxy-functional compound (D), A Is an acyl radical. Each epoxy group converted thus results in at least one pendant OH group. If, as in the case of water, A=H, each epoxy group converted results in exactly two pendant OH groups. In all other cases, i.e. A≠H, each epoxy group converted results in exactly one pendant OH group.

In the case of the polybutadienes (A) having a predominant proportion of 1,4 units that are preferred in accordance with the invention, those of the formula (2a) are predominant among the repeat units of the formulae (2a), (2b) and (2c).

It is preferable that the at least one hydroxy-functional polybutadiene (E) has 20% to 100%, preferably 70% to 100%, further preferably 90% to 100%, especially preferably 95% to 100%, repeat units of the formula (2a) based on the sum total of the repeat units of the formulae (2a), (2b) and (2c).

It is further preferable that the proportion or the repeat units or the Formulae (2a), (2b) and (2c) together Is >0% to 70%, preferably 1% to 50%, further preferably 2% to 40%, even further preferably 3% to 30% and especially preferably 4% to 20%, based on the total number of all repeat units of the at least one hydroxy-functional polybutadiene (E). It Is correspondingly preferable that the degree of hydroxylation is >0% to 70%, preferably 1% to 50%, further preferably 2% to 40%, even further preferably 3% to 30% and especially preferably 4% to 20%. On completion of conversion in step b), the degree of hydroxylation of the hydroxy-functional polybutadiene (E) corresponds to the degree of epoxidation of the corresponding epoxy-functional polybutadiene (C).

The Preferred Configuration of Step c) of the Process According to the Invention:

In step c) of the process according to the Invention, the at least one hydroxy-functional polybutadiene (E) is reacted with at least one epoxy-functional compound (F) to give at least one polyether-modified polybutadiene (G).

The at least one hydroxy-functional polybutadiene (E) from step b) serves, in step c), as starter compound for the reaction with the at least one epoxy-functional compound (F). Under ring opening and preferably in the presence or a suitable catalyst, the at least one epoxy-functional compound (F) (also referred to hereinafter simply as "monomer" or "epoxy monomer" or "epoxide") Is added onto the OH groups of the at least one hydroxy-functional polybutadiene (E) In a polyaddition reaction. This leads to the formation of the polybutadienes according to the invention with polyether chains in comb (pendant) positions, i.e. to the formation of the at least one polyether-modified polybutadiene (G). The polyether-modified polybutadiene (G) Is preferably a linear polybutadiene having pendant (lateral) modification with polyether radicals. It is thus preferable that the polyether-modified polybutadiene (G) has a linear polybutadiene backbone and pendant polyether radicals.

The reaction in step c) is preferably an alkoxylation reaction, i.e. a polyaddition of alkylene oxides onto the at least one hydroxy-functional polybutadiene (E). However, the reaction in step c) may also be conducted with glycidyl compounds alternatively or additionally to the alkylene oxides.

It Is therefore preferable that the at least one epoxy-functional compound used in step c) Is selected from the group of the alkylene oxides, preferably from the group of the alkylene oxides having 2 to 18 carbon atoms, further preferably from the group of the alkylene oxides having 2 to 8 carbon atoms, especially preferably from the group consisting of ethylene oxide, propylene oxide, 1-butylene oxide, cis-2-butylene oxide, trans-2-butylene oxide, isobutylene oxide and styrene oxide; and/or that the at least one epoxy-functional compound used in step c) Is selected from the group of the glycidyl compounds, preferably from the group of the monofunctional glycidyl compounds, more preferably from the group consisting of phenyl glycidyl ether, o-cresyl glycidyl ether, tert-butylphenyl glycidyl ether, allyl glycidyl ether, butyl glycidyl ether, 2-ethylhexyl glycidyl ether, $C_{12}/C_{14}$ fatty alcohol glycidyl ether and Cn/Cis fatty alcohol glycidyl ether.

The monomers may be added either individually in pure form, in alternating succession in any metering sequence, or else simultaneously in mixed form. The sequence of monomer units in the resultant polyether chain is thus subject to a blockwise distribution or a random distribution or a gradient distribution in the end product.

By the process according to the invention, pendant polyether chains are constructed on the polybutadiene, which can be prepared in a controlled and reproducible manner in terms of structure and molar mass.

The sequence of monomer units can be varied by the sequence of addition within broad limits.

The molar masses of the pendant polyether radicals may be varied within broad limits by the process according to the invention, and controlled specifically and reproducibly via the molar ratio of the added monomers in relation to the OH groups of the at least one initially charged hydroxy-functional polybutadiene (E) from step b).

The polyether-modified polybutadienes (G) prepared in accordance with the invention are preferably characterized in that they contain B radicals bonded to the polybutadiene skeleton via an ether group according to the formulae (3a), (3b) and (3c)

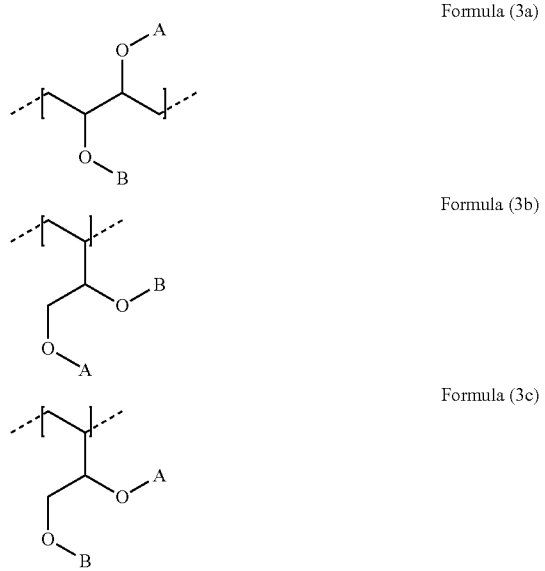

Formula (3a)

Formula (3b)

Formula (3c)

As set out above for step b), the A radical in the formulae (3a), (3b) and (3c) comes from the compound A-OH, i.e. the hydroxy-functional compound (D) used in step b). As likewise set out above, two cases should be distinguished in step b), namely A≠H or A=H. In the first case. i.e. when A≠H, the A radical in the formulae (3a). (3b) and (3c) is identical to the A radical in the formulae (2a), (2b) and (2c). In the second case, i.e. when A=H, the A radical in the formulae (3a), (3b) and (3c) is in each case independently H or a B radical. If, for example, a monofunctional aliphatic alcohol having 1 to 6 carbon atoms is used as hydroxy-functional compound (D), A is an alkyl radical having 1 to 6 carbon atoms. If, for example, a carboxylic acid is used as hydroxy-functional compound (D), A is an acyl radical. If, however, water is used as hydroxy-functional compound (D), A in the formulae (3a), (3b) and (3c) is a B radical in the case of reaction with one or more epoxy-functional compounds (F); A remains hydrogen in the case that there is no reaction. Thus, each pendant hydroxyl group converted results in exactly one pendant —O—B radical. The B radical is in turn formed from one or more monomers, preferably from multiple monomers, of the at least one epoxy-functional compound (F) used.

In the context of the invention, it is possible in principle to use all alkoxylation catalysts known to the person skilled in the art, for example basic catalysts such as alkali metal hydroxides, alkali metal alkoxides, amines, guanidines, amidines, phosphorus compounds such as triphenylphosphine, and additionally acidic and Lewis-acidic catalysts such as $SnCl_4$, $SnCl_2$, $SnF_2$, $BF_3$ and $BF_3$ complexes, and also double metal cyanide (DMC) catalysts.

Prior to the feeding of epoxide, i.e. prior to the addition of the at least one epoxy-functional compound (F) used, the reactor partly filled with the starter and catalyst is inertized, for example with nitrogen. This is accomplished, for example, by repeated alternating evacuation and supply of nitrogen. It is advantageous to evacuate the reactor to below 200 mbar after the last injection of nitrogen. The addition of the first amount of epoxy monomer thus preferably takes place into the evacuated reactor. The monomers are dosed while stirring and optionally cooling in order to remove the heat of reaction released and to maintain the preselected reaction temperature. The starter used is the at least one hydroxy-functional polybutadiene (E), or else it is possible to use a polyether-modified polybutadiene (G) already prepared by the process of the invention as starter, as described further down.

DMC Catalysis

Preference is given to using zinc/cobalt DMC catalysts, especially those containing zinc hexacyanocobaltate(III). Preference is given to using the DMC catalysts described in U.S. Pat. No. 5,158,922, US 20030119683, WO 01/80994. The catalysts may be amorphous or crystalline.

It is preferable that the catalyst concentration is preferably >0 ppmw to 1000 ppmw, preferably >0 ppmw to 700 ppmw, more preferably 10 ppmw to 500 ppmw, based on the total mass of the products formed.

The catalyst is preferably metered into the reactor only once. The catalyst should preferably be clean, dry and free of basic Impurities that could inhibit the DMC catalyst. The amount of catalyst should preferably be set so as to give sufficient catalytic activity for the process. The catalyst may be metered in in solid form or in the form of a catalyst suspension. If a suspension is used, the OH-functional starter is especially suitable as suspension medium.

In order to start the DMC-catalysed reaction, it may be advantageous first to activate the catalyst with a portion of the at least one epoxy-functional compound (F), preferably selected from the group of the alkylene oxides, especially with propylene oxide and/or ethylene oxide. After the alkoxylation reaction has set in, it is possible to commence the continuous monomer addition.

The reaction temperature in the case of a DMC-catalysed reaction in step c) is preferably 60° C. to 200° C. further preferably 90° C. to 160° C., more preferably 100° C. to 140° C.

The internal reactor pressure in the case of a DMC-catalysed reaction in step c) is preferably 0.02 bar to 100 bar, further preferably 0.05 bar to 20 bar, more preferably 0.1 bar to 10 bar (absolute).

More preferably, a DMC-catalysed reaction in step c) is conducted at a temperature of 100° C. to 140° C. and a pressure of from 0.1 bar to 10 bar.

The reaction may be performed in a suitable solvent, for example for the purpose of lowering the viscosity. After the epoxide addition has ended, there preferably follows a period of further reaction for completion of the conversion. The further reaction can be conducted, for example, by continued reaction under reaction conditions (i.e. maintenance, for example, of the temperature) without addition of reactants. The DMC catalyst typically remains in the reaction mixture.

Unreacted epoxides and any further volatile constituents can be removed on completion of conversion by vacuum distillation, steam or gas stripping, or other methods of deodorization. The finished product is finally filtered at <100° C. in order to remove any cloudy substances.

Base Catalysis

As well as the DMC catalysts, it is also possible in accordance with the invention to use basic catalysts in step c). Especially suitable are alkali metal alkoxides such as sodium methoxide and potassium methoxide, which are added in solid form or in the form of their methanolic solutions. In addition, it is possible to use all alkali metal hydroxides, especially sodium hydroxide and potassium hydroxide, either in solid form or in the form of aqueous or alcoholic solutions, for example. In addition, it is also possible in accordance with the invention to use basic nitrogen compounds, preferably amines, guanidines and amidines, more preferably tertiary amines such as trimethylamine and triethylamine.

It is preferable to use the basic catalysts in a concentration of >0 mol % to 100 mol %, preferably >0 mol % to 50 mol %, more preferably 3 mol % to 40 mol %, based on the amount of OH groups in the starter.

The reaction temperature in the case of a base-catalysed reaction in step c) is preferably 80° C. to 200° C., further preferably 90° C. to 160° C., more preferably 100° C. to 160° C.

The internal reactor pressure in the case of a base-catalysed reaction in step c) is preferably 0.2 bar to 100 bar, further preferably 0.5 bar to 20 bar, more preferably 1 bar to 10 bar (absolute).

More preferably, the base-catalysed reaction in step c) is conducted at a temperature of 100° C. to 160° C. and a pressure of from 1 bar to 10 bar.

The reaction may optionally be performed in a suitable solvent. After the epoxide addition has ended, there preferably follows a period of further reaction for completion of the conversion. The further reaction can be conducted, for example, by continued reaction under reaction conditions without addition of reactants. Unreacted epoxides and any further volatile constituents can be removed on completion of conversion by vacuum distillation, steam or gas stripping, or other methods of deodorization. Volatile catalysts such as amines are removed here.

For neutralization of the basic crude products, acids such as phosphoric acid or sulfuric acid or carboxylic acids such as acetic acid and lactic acid are added. Preference Is given to the use of aqueous phosphoric acid and lactic acid. The amount of the respective acid used is guided by the amount of basic catalyst used beforehand. The basic polybutadiene with pendant polyether radicals is stirred in the presence of the acid at preferably 40° C. to 95° C. and then distilled to dryness in a vacuum distillation at <100 mbar and 80° C. to 130° C. The neutralized product is finally filtered, preferably at <100° C., In order to remove precipitated salts.

It Is preferable that the end products according to the invention have a water content of <0.2% (reported as proportion by mass based on the total mass of the end product) and an acid number of <0.5 mg KOH/g and are virtually phosphate-free.

Products as Starters

Is not always possible to achieve the desired molar mass of the end product in just a single reaction step, especially alkoxylation step. Particularly when long polyether side chains are the aim and/or the starter from step b) has a high OH functionality, it is necessary to add large amounts of epoxy monomers. This Is sometimes not permitted by the reactor geometry. The polyether-modified polybutadienes (G) prepared in accordance with the invention from step c) bear an OH group at the ends of each of their pendant polyether radicals, and are therefore suitable in turn as starter for construction of conversion products of higher molecular weight. In the context of the invention, they are precursors and starter compounds for the synthesis of polybutadienes having relatively long polyether radicals. The at least one epoxy-functional compound (F) can thus be converted in step c) in multiple component steps.

A product prepared with the aid or DMC catalysis in step c) may, in accordance with the Invention, have its level or alkoxylation Increased by new addition of epoxy monomers, either by means of DMC catalysis or with use of one of the aforementioned basic or acidic catalysts. It is optionally possible to add a further DMC catalyst in order, for example, to Increase the reaction rate in the chain extension.

A product prepared under base catalysis from step c) may be alkoxylated to higher molar masses either under basic or acidic conditions or by means of DMC catalysis. In step c), neutralization is advantageously dispensed with if the aim is to react the basic precursor further with monomers under base catalysis. It is optionally possible to add a further basic catalyst in order, for example, to increase the reaction rate in the chain extension.

Optional Step d)

In an optional further step d), the at least one polyether-modified polybutadiene (G) is reacted with at least one end-capping reagent (H) to give at least one polyether-modified polybutadiene (K) containing end-capped polyether radicals.

This further converts the B radicals of the polyether-modified polybutadiene (G) having hydroxyl groups in terminal positions to give ester, ether, urethane and/or carbonate groups in terminal positions. The end-capping of polyethers is known to the person skilled in the art, for example esterification with carboxylic acids and carboxylic anhydrides, especially acetylation with the aid of acetic anhydride, etherification with halogenated hydrocarbons, especially methylation with methyl chloride by the principle of Williamson ether synthesis, the urethanization by reaction of the OH groups with Isocyanates, especially with monoisocyanates such as stearyl isocyanate, and carbonation by reaction with dimethyl carbonate and diethyl carbonate.
Optional Step e)

In an optional step e), the at least one polyether-modified polybutadiene (G) or (K) is lightened in colour.

If the optional step e) follows the optional step d), the at least one polyether-modified polybutadiene (K) containing end-capped polyether radicals is lightened in colour. If, by contrast, the optional step d) Is dispensed with, the optional step e) follows step c) of the process according to the Invention and the at least one polyether-modified polybutadiene (G) is lightened in colour. The colour lightening can be effected, for example, by the addition of activated carbon, preferably in a suitable solvent, or by treatment with hydrogen peroxide. The colour lightening can preferably be ascertained via the Gardner colour number (determined to DIN EN ISO 4630). It is preferable here that the Gardner colour number of the polyether-modified polybutadiene (G) or (K) is reduced by the colour lightening by at least 1, preferably by at least 2. Particular preference is given to polyether-modified polybutadienes (G) or (K) having a Gardner colour number of not more than 3, especially of not more than 2.5.
Reactors Reactors used for the process according to the invention may in principle be any suitable reactor types that allow control over the reaction and any exothermicity therein. The reaction regime may be continuous, semicontinuous or else batchwise in a manner known from chemical engineering, and can be matched flexibly to the production equipment available. As well as conventional stirred tank reactors, it is also possible to use jet loop reactors with a gas phase and internal heat exchanger tubes as described in WO 01/062826. In addition, it Is possible to use gas phase-free loop reactors.

Polyether-Modified Polybutadienes

The present invention further provides polybutadienes modified with polyether radicals in comb (pendant) positions, as preparable by the process according to the invention.

The invention therefore further provides a polyether-modified polybutadiene (G) or (K) obtainable by the process according to the invention.

The polyether-modified polybutadiene (G) or (K) is preferably a linear polybutadiene having pendant (lateral) modification with polyether radicals. It is thus preferable that the polyether-modified polybutadiene (G) or (K) has a linear polybutadiene backbone and pendant polyether radicals.

The Invention likewise further provides a polyether-modified polybutadiene (G) or (K) preferably obtainable by the process according to the Invention, characterized in that the polyether-modified polybutadiene (G) or (K) comprises repeat units selected from the group consisting of the divalent radicals

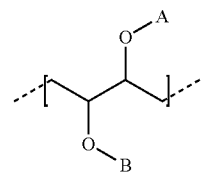

(U)

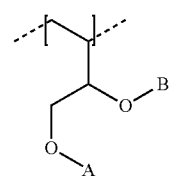

(V)

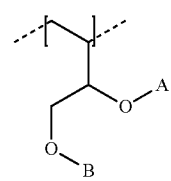

(W)

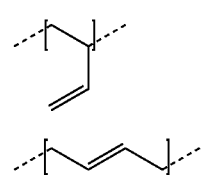

(X)

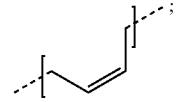

(Y)

(Z)

where
A is in each case independently a monovalent organic radical or a hydrogen radical,
  preferably in each case Independently selected from the group consisting of monovalent hydrocarbon radicals having 1 to 6 carbon atoms,
  more preferably in each case Independently selected from the group consisting of alkyl radicals having 1 to 4 carbon atoms;
B is in each case independently selected from the group consisting of radicals of the formula (4a)

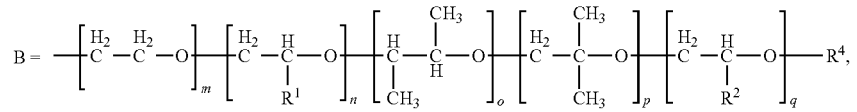

Formula (4a)

preferably in each case independently selected from the group consisting of radicals of the formula (4b)

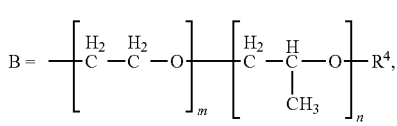

Formula (4b)

more preferably in each case independently selected from the group consisting of radicals of the formula (4c)

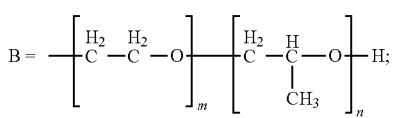

Formula (4c)

$R^1$ is in each case independently selected from the group consisting of monovalent hydrocarbon radicals having 1 to 16 carbon atoms,
 preferably in each case independently an alkyl radical having 1 to 16 carbon atoms or a phenyl radical,
 more preferably in each case independently a methyl radical, an ethyl radical or a phenyl radical;
$R^2$ is a radical of the formula —$CH_2$—O—$R^3$;
$R^3$ is in each case independently selected from the group consisting of monovalent hydrocarbon radicals having 3 to 18 carbon atoms;
 preferably in each case independently an allyl radical, a butyl radical, an alkyl radical having 8 to 15 carbon atoms or a phenyl radical that may be substituted by monovalent radicals selected from hydrocarbon radicals having 1 to 4 carbon atoms;
 more preferably a tert-butylphenyl radical or an o-cresyl radical;
$R^4$ is in each case independently a monovalent organic radical having 1 to 18 carbon atoms or hydrogen, preferably hydrogen;
and
m, n, o, p and q are each independently 0 to 300, preferably 0 to 200, more preferably 0 to 100, with the proviso that the sum total of m, n, o, p and q is greater than 1, preferably greater than 5, more preferably greater than 10;
including every permutation of the repeat units (U), (V), (W), (X), (Y) and (Z) and of the repeat units in the B radical.

The $R^1$, $R^2$, $R^3$ and $R^4$ radicals may each independently be linear or branched, saturated or unsaturated, aliphatic or aromatic, and substituted or unsubstituted.

The general notation

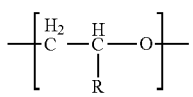

with R=$R^1$ or $R^2$ in formula (4a) or R=$CH_3$ in the formulae (4b) and (4c) represents either a unit of the formula

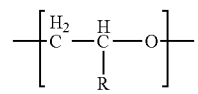

or a unit of the formula

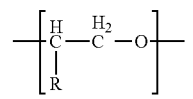

but preferably a unit of the formula

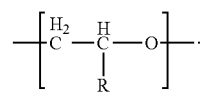

The general notation

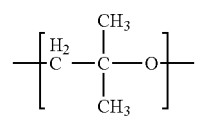

in formula (4a) represents either a unit of the formula

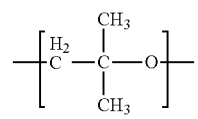

or a unit of the formula

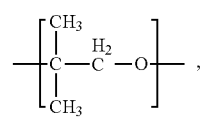

but preferably a unit of the formula

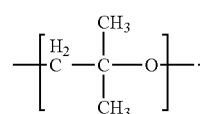

It is further preferable that the $R^4$ radical is in each case independently selected from the group consisting of monovalent hydrocarbon radicals having 1 to 18 carbon atoms, acyl radicals —C(=O)$R^5$, urethane radicals —C(=O)NH—$R^6$, carbonate radicals —C(=O)O—$R^7$ and hydrogen; $R^4$ is further preferably in each case independently selected from the group consisting of alkyl radicals having 1 to 18 carbon atoms, alkylene radicals having 1 to 18 carbon atoms, acyl radicals —C(=O)R⁵, urethane radicals —C(=O)NH—R⁶, carbonate radicals —C(=O)O—R⁷ and hydrogen; more preferably, $R^4$ is hydrogen.

$R^5$ is in each case independently an alkyl or alkenyl radical having 1 to 18 carbon atoms, preferably having 1 to 10 carbon atoms, more preferably a methyl radical.

$R^6$ is in each case independently an alkyl or aryl radical having 1 to 18 carbon atoms, preferably having 6 to 18 carbon atoms.

$R^7$ is in each case Independently an alkyl radical having 1 to 18 carbon atoms, preferably having 1 or 2 carbon atoms.

It is preferable here that the sum total of all repeat units (U), (V) and (V) divided by the sum total of all repeat units (U), (V), (W), (X), (Y) and (Z) in the at least one polyether-modified polybutadiene (G) or (K) is from >0% to 70% preferably from 1% to 50%, further preferably from 2% to 40%, even further preferably from 3% to 30%, especially preferably from 4% to 20%.

This means that >0% to 70%, preferably 1% to 50%, further preferably from 2% to 40%, even further preferably from 3% to 30%, especially preferably from 4% to 20%, of the entirety of the repeat units (U), (V), (W), (X), (Y) and (Z) is polyether-modified.

It is preferable that the polyether-modified polybutadiene (G) or (K) is a polybutadiene of the formula (5) that has been modified with pendant polyether radicals, Formula (5)

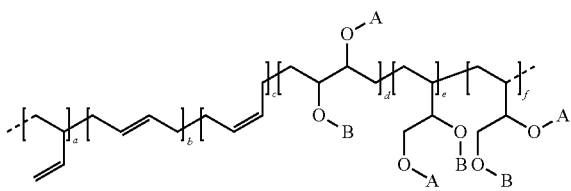

wherein the proportion of the polyether-modified repeat units shown in formula (5), based on the sum total of all repeat units shown in formula (5), is >0% to 70%, preferably 1% to 50%, further preferably 2% to 40%, even further preferably 3% to 30%, especially preferably 4% to 20%, where the proportion is calculated as [(d+e+f)/(a+b+c+d+e+f)]*100%.

The repeat units with the indices a, b, c, d, e and f are distributed in an arbitrary, statistical manner over the polybutadiene chain. All the Indices reported should therefore be regarded as averages.

The number-average molar mass $M_n$, weight-average molar mass $M_w$ and polydispersity of the polybutadiene component of the polyether-modified polybutadiene (G) or (K) are freely variable. The polybutadiene component Is understood to mean the component of the polyether-modified polybutadiene (G) or (K) that comes from the polybutadiene (A) used in the process. In formula (5), the polybutadiene component of the polyether-modified polybutadiene (G) or (K) Is understood to mean the component of the polymer that results from the polyether-modified polybutadiene (G) or (K) minus the A-O and B-O radicals.

It is preferable that the number-average molar mass $M_n$ of the polybutadiene component of the polyether-modified polybutadiene (G) or (K) is from 200 g/mol to 20 000 g/mol, preferably from 500 g/mol to 10 000 g/mol, more preferably from 700 g/mol to 5000 g/mol.

Alternatively, it is preferable that the number-average molar mass $M_n$ of the polybutadiene component of the polyether-modified polybutadiene (G) or (K) Is from 2100 g/mol to 20 000 g/mol, more preferably from 2200 g/mol to 10 000 g/mol, most preferably from 2300 g/mol to 5000 g/mol.

The number-average molar mass $M_n$ of the polybutadiene component is defined here as the number-average molar mass $M_n$ of the underlying polybutadiene (A).

It is further preferable that the polyether-modified polybutadiene (G) or (K) has a number average of 5 to 380, more preferably 10 to 180, most preferably 15 to 90, repeat units, where the repeat units are selected from the group consisting of (U), (V), (W), (X), (Y) and (Z).

Alternatively, it Is preferable that the polyether-modified polybutadiene (G) or (K) has a number average of 35 to 360, more preferably 40 to 180, most preferably 45 to 90, repeat units, where the repeat units are selected from the group consisting of (U), (V), (W), (X), (Y) and (Z).

It is further preferable that the polyether-modified polybutadienes (G) or (K) are characterized in that 0% to 80%, preferably 0% to 30%, especially preferably 0% to 10% and most preferably 0% to 5%, of the double bonds present are 1,2 vinyl double bonds, and 20% to 100%, preferably 70% to 100%, especially preferably 90% to 100% and most preferably 95% to 100%, of the double bonds present are 1.4 double bonds.

Preference is therefore given in the context of the invention to compounds of the formula (5) having a content of 0% to 80% 1,2 vinyl double bonds (Index a) and 20% to 100% 1,4 double bonds (sum of Indices b and c), preferably having 0% to 30% 1,2 vinyl double bonds and 70% to 100% 1,4 double bonds, especially preferably having 0% to 10% 1,2 vinyl double bonds and 90% to 100% 1,4 double bonds, and most preferably 0% to 5% 1,2 vinyl double bonds and 95% to 100% 1,4 double bonds, based on the total number of double bond-containing repeat units (sum of a+b+c). The ratio of 1,4-trans double bonds (index b) and 1,4-cis double bonds (index c) is freely variable.

Particular preference is given to compounds of the formula (5) having a content of >95% of repeat units with index d based on the sum total of repeat units d+e+f. The ratio of repeat units e and f relative to one another is freely variable.

Very particular preference is given to those polyether-modified polybutadienes (G) or (K) that derive from the above-described polybutadienes Polyvest® 110 and Polyvest® 130 from Evonik Industries AG/Evonik Operations GmbH and Lithene ultra AL and Lithene ActiV 50 from Synthomer PLC.

The molar mass and polydispersity of the B radicals is freely variable. However, it is preferable that the average molar mass of the B radicals is from 100 g/mol to 20 000 g/mol, preferably from 200 g/mol to 15 000 g/mol, more preferably from 400 g/mol to 10 000 g/mol. The average molar mass of the B radicals may be calculated from the starting weight of the monomers used based on the number of OH groups of the hydroxy-functional polybutadiene (E) used. Thus, for example, if 40 g of ethylene oxide is used and the amount of the hydroxy-functional polybutadiene (E) used has 0.05 mol of OH groups, the average molar mass of the B radical is 800 g/mol.

The polyether-modified polybutadienes (G) or (K), according to the composition and molar mass, are liquid, pasty or solid.

The number-average molar mass $M_n$ of the polyether-modified polybutadienes (G) or (K) is preferably from 1000 g/mol to 6000 g/mol, further preferably from 1500 g/mol to 5000 g/mol, especially preferably from 2000 g/mol to 4000 g/mol.

Their polydispersity Is variable within broad ranges. The polydispersity of the at least one polyether-modified polybutadiene (G) or (K), by the GPC method against PPG standard, is preferably $M_w/M_n$=1.5 to 10, further preferably between 2 and 9, more preferably between 3 and 8.

The examples which follow describe the present invention by way of example, without any intention of restricting the invention, the scope of application of which is apparent from the entirety of the description to the embodiments cited in the examples.

EXAMPLES

General Methods:
Gel Permeation Chromatogaphy (GPC):

GPC measurements for determination of polydispersity ($M_w/M_n$), weight-average molar mass ($M_w$) and number-average molar mass ($M_n$) were conducted under the following measurement conditions: SDV 1000/10 000 Å column combination (length 65 cm), temperature 30° C. THF as mobile phase, flow rate 1 ml/min, sample concentration 10 g/l, RI detector, evaluation against polypropylene glycol standard.

Determination of the Content of the 1,4-Cis, 1,4-Trans and 1,2 Units in the Polybutadlene:

The content of 1,4-cis, 1,4-trans and 1,2 units can be determined with the aid of $^1$H NMR spectroscopy. This method is familiar to the person skilled in the art.

Determination of the Content of Epoxy Groups in the Polybutadiene (Epoxy Content, Epoxidation Level):

The content of epoxy groups was determined with the aid of $^{13}$C NMR spectroscopy. A Bruker Avance 400 NMR spectrometer was used. For this purpose, the samples were dissolved in deuterochloroform. The epoxy content is defined as the proportion of epoxidized butadiene units in mol % based on the entirety of all repeat units present in the sample. This corresponds to the number of epoxy groups in the epoxidized polybutadiene divided by the number of double bonds in the polybutadiene used.

Determination of Acid Number:

Acid number determination was performed by a titration method in accordance with DIN EN ISO 2114.

Determination of Colour Lightening:

Colour lightening was ascertained by the change in Gardner colour number (determined to DIN ISO 4630).

SYNTHESIS EXAMPLES

Step a), Preparation of Epoxidized Polybutadienes

Example A1

An epoxidized polybutadiene was prepared using a polybutadiene of the formula (1) having the structure x=1%, y=24% and z=75% (Polyvest® 110). According to the prior art, a 20 L reactor under a nitrogen atmosphere was initially charged with 1600 g of Polyvest® 110 and 86.4 g of conc. formic acid in 4000 g of chloroform at room temperature. Subsequently, 320 g of 30% $H_2O_2$ solution (30% by weight of $H_2O_2$ based on the total mass of the aqueous solution) was slowly added dropwise and then the solution was heated to 50° C. for 7 h. After the reaction had ended, the mixture was cooled down to room temperature, and the organic phase was removed and washed four times with dist. $H_2O$. Excess chloroform and residual water were distilled off. 1556 g of the product was obtained, which was admixed with 1000 ppm of Irganox® 1135 and stored under nitrogen.

Evaluation by means of $^{13}$C NMR gave an epoxidation level of about 8.9% of the double bonds.
$M_w$=4669 g/mol; $M_n$=1931 g/mol; $M_w/M_n$=2.4

Example A2

By the process described in Example A1, a 2 L four-neck flask was initially charged with 200 g of Polyvest® 110 and 6.5 g of conc. formic acid in 200 g of chloroform, and 24 g of 30% $H_2O_2$ solution (30% by weight of $H_2O_2$, based on the total mass of the aqueous solution) was added. After 7 hours at 50° C., phase separation, washing with dist. $H_2O$ and subsequent distillation. 191 g of an epoxidized polybutadiene with an epoxidation level or about 6.7% of the double bonds by $^{13}$C NMR analysis was achieved.
$M_w$=4624 g/mol; $M_n$=2022 g/mol; $M_w/M_n$=2.3

Example A3

By the process described in Example A1, a 2 L four-neck flask was initially charged with 200 g of Polyvest® 110 and 19.5 g of conc. formic acid in 200 g of chloroform, and 72 g of 30% $H_2O_2$ solution (30% by weight of $H_2O_2$, based on the total mass of the aqueous solution) was added. After 7 hours at 50° C., phase separation, washing with dist. $H_2O$ and subsequent distillation, 196 g of an epoxidized polybutadiene with an epoxidation level of about 16.2% of the double bonds by $^3$C NMR analysis was achieved.
$M_w$=4943 g/mol; $M_n$=2083 g/mol: $M_w/M_n$=2.4

Example A4

By the process described in Example A1, a 2 L four-neck flask was initially charged with 200 g or Polyvest® 110 and 24.2 g of conc. formic acid in 200 g of chloroform, and 89.3 g of 30% $H_2O_2$ solution (30% by weight of $H_2O_2$, based on the total mass of the aqueous solution) was added. After 7 hours at 50° C., phase separation, washing with dist. $H_2O$ and subsequent distillation. 204 g of an epoxidized polybutadiene with an epoxidation level or about 21.0% of the double bonds by $^{13}$C NMR analysis was achieved.
$M_w$=4843 g/mol; $M_n$=2025 g/mol; $M_w/M_n$=2.4

Example A5

By the process described in Example A1, a 2 L four-neck flask was initially charged with 200 g of Polyvest® 110 and 10.8 g of conc. formic acid in 200 g of toluene, and 40 g of 30% $H_2O_2$ solution (30% by weight of $H_2O_2$, based on the total mass or the aqueous solution) was added. After 10 hours at 50° C., phase separation, washing with sat. $NaHCO_3$ solution and subsequent distillation, 172 g of an epoxidized polybutadiene with an epoxidation level of about 7.6% of the double bonds by $^{13}$C NMR analysis was achieved.
$M_w$=4634 g/mol; $M_n$=2020 g/mol; $M_w/M_n$=2.3

Example A6

By the process described in Example A1, a 20 L reactor was initially charged with 2000 g of a polybutadiene of the formula (1) with the structure of x=1%, y=22% and z=77% (Polyvest® 130) and 191 g of conc. formic acid in 5000 g of chloroform, and 710 g of 30% $H_2O_2$ solution (30% by weight of $H_2O_2$, based on the total mass of the aqueous solution) was added. After 7 hours at 50° C., phase separation, washing with dist. $H_2O$ and subsequent distillation, 1980 g of an epoxidized polybutadiene with an epoxidation level of about 14.6% of the double bonds by $^{13}C$ NMR analysis was achieved.

$M_w$=15 333 g/mol; $M_n$=3455 g/mol; $M_w/M_n$=4.4

Example A7

By the process described in Example A1, a 2 l four-neck flask was initially charged with 800 g of Polyvest® 110 and 432 g of conc. formic acid in 800 g of chloroform, and 160 g of 30% $H_2O_2$ solution (30% by weight of $H_2O_2$ based on the total mass of the aqueous solution) was added. After 5 hours at 50° C., phase separation, washing with dist. $H_2O$ and subsequent distillation, 755 g of an epoxidized polybutadiene having an epoxidation level of about 8.7% of the double bonds by $^{13}C$ NMR analysis was achieved.

$M_w$=4593 g/mol; $M_n$=1975 g/mol: $M_w/M_n$=2.3

Example A8

By the process described in Example A1, a 2 l four-neck flask was initially charged with 200 g of a polybutadiene of the formula (1) having the structure x=40%, y+z=60% (Lithene ultra AL) and 122 g of conc. formic acid in 200 g of chloroform, and 299 g of 30% $H_2O_2$ solution (30% by weight of $H_2O_2$ based on the total mass of the aqueous solution) was added. After 7 hours at 50° C., phase separation, washing with dist. $H_2O$ and subsequent distillation, 218 g of an epoxidized polybutadiene having an epoxidation level of about 60% of the double bonds by $^{13}C$ NMR analysis was achieved.

$M_w$=1670 g/mol; $M_n$=832 g/mol; $M_w/M_n$=2.0

Example A9

By the process described in Example A1, a 2 l four-neck flask was initially charged with 200 g of a polybutadiene of the formula (1) having the structure x=70%, y+z=30% (Lithene ActiV 50) and 61 g of conc. formic acid in 200 g chloroform and 151 g of 30% $H_2O_2$ solution (30% by weight of $H_2O_2$ based on the total mass of the aqueous solution) was added. After 6 hours at 50° C., phase separation, washing with dist. $H_2O$ and subsequent distillation, 205 g of an epoxidized polybutadiene having an epoxidation level of about 30% of the double bonds by $^{13}C$ NMR analysis was achieved.

$M_w$=1821 g/mol; $M_n$=1045 g/mol; $M_w/M_n$=1.7

Step b), Preparation of OH-Functional Polybutadienes

Example B1

A hydroxylated polybutadiene having a hydroxylation level of about 21% was prepared using the epoxidized polybutadiene prepared in Example A4. The hydroxylation level here Is the number of OH groups of the OH-functional polybutadiene divided by the number of double bonds in the polybutadiene used in step a). For the preparation, a 100 ml four-neck flask under a nitrogen atmosphere was Initially charged with 18 g of the epoxidized polybutadlene in 45 g of n-propanol, and 80 ppmw of trlfluoromethanesulfonic acid (based on mass of epoxidized polybutadiene) dissolved in n-propanol (1% solution) was added while stirring. This was followed by heating to 70° C. and stirring of the mixture at that temperature for 8 hours. The reaction mixture became clear during the reaction. After the reaction had ended, the mixture was cooled down to room temperature and the solution was neutralized by adding 0.8 mg of solid $NaHCO_3$ and then filtered. The excess alcohol was distilled off under reduced pressure. The alcohol recovered by distillation can be reused in subsequent syntheses. 16.9 g of a brownish product was obtained, which was admixed with 1000 ppm of Irganox® 1135 and stored under nitrogen.

Evaluation by means of $^{13}C$ NMR showed complete conversion of all epoxy groups, which gives a hydroxylation level of about 21%.

$M_w$=14 463 g/mol; $M_n$=2789 g/mol; $M_w/M_n$=5.2

Example B2

For preparation of a hydroxylated polybutadiene having a hydroxylation level of about 8.9%, by the process described in Example B1, 20 g of the epoxidized polybutadiene prepared in Example A1 was initially charged in 45 g of n-propanol, and 80 ppmw of trifluoromethanesulfonic acid (based on mass of epoxidized polybutadiene) dissolved in n-propanol (1% solution) was added while stirring. After stirring at 70° C. for 7 hours, the reaction mixture was neutralized at room temperature (RT) with 0.9 mg of solid $NaHCO_3$ and filtered, and the excess alcohol was distilled off under reduced pressure. 18 g of a brownish product was obtained, which was admixed with 1000 ppm of Irganox® 1135 and stored under nitrogen.

Evaluation by means of $^{13}C$ NMR showed complete conversion of all epoxy groups, which gives a hydroxylation level of about 8.9%.

$M_w$=28 138 g/mol; $M_n$=2534 g/mol; $M_w/M_n$=11.1

Example B3

For preparation of a hydroxylated polybutadlene having a hydroxylation level of about 21%, by the process described in Example B1, 18 g of the epoxidized polybutadiene prepared in Example A4 was initially charged in 45 g of isopropanol, and 80 ppmw of trifluoromethanesulfonic acid (based on mass of epoxidized polybutadiene) dissolved in isopropanol (1% solution) was added while stirring. After stirring at 70° C. for 7 hours, the reaction mixture was neutralized at RT with 0.8 mg of solid $NaHCO_3$ and filtered, and the excess alcohol was distilled off under reduced pressure. 16.4 g of a brownish product was obtained, which was admixed with 1000 ppm of Irganox® 1135 and stored under nitrogen.

Evaluation by means of $^{13}C$ NMR showed complete conversion of all epoxy groups, which gives a hydroxylation level of about 21%.

$M_w$=14 012 g/mol: $M_n$=2534 g/mol; $M_w/M_n$=5.5

Example B4

For preparation of a hydroxylated polybutadiene having a hydroxylation level of about 21%, by the process described in Example B1, 54 g of the epoxidized polybutadlene prepared in Example A4 was Initially charged in 135 g of isobutanol, and 80 ppmw of trifluoromethanesulfonic acid (based on mass of epoxidized polybutadiene) dissolved in isobutanol (1% solution) was added while stirring. After stirring at 70° C. for 5 hours, the reaction mixture was neutralized at RT with 2.4 mg of solid $NaHCO_3$ and filtered, and the excess alcohol was distilled off under reduced pressure. 50 g of a brownish product was obtained, which was admixed with 1000 ppm of Irganox® 1135 and stored under nitrogen.

Evaluation by means of $^{13}$C NMR showed complete conversion of all epoxy groups, which gives a hydroxylation level of about 21%.

$M_w$=11 357 g/mol: $M_n$=2890 g/mol; $M_w/M_n$=4.2

Example B5

For preparation of a hydroxylated polybutadlene having a hydroxylation level of about 8.9%, by the process described in Example B1, a 20 L reactor was Initially charged with 1500 g of the epoxidized polybutadiene prepared in Example A1 in 3150 g of isobutanol, which was recovered by distillation in Example B8, and 80 ppmw of trifluoromethanesulfonic acid (based on mass of epoxidized polybutadiene) dissolved in isobutanol (1% solution) was added while stirring. After stirring at 70° C. for 5 hours, the reaction mixture was neutralized at RT with 67.5 mg of solid NaHCO$_3$ and filtered, and the excess alcohol was distilled off under reduced pressure. 1380 g of a brownish product was obtained, which was admixed with 1000 ppm of Irganox® 1135 and stored under nitrogen.

Evaluation by means of $^{13}$C NMR showed complete conversion of all epoxy groups, which gives a hydroxylation level of about 8.9%.

$M_w$=8597 g/mol; $M_n$=2306 g/mol; $M_w/M_n$=3.7

Example B8

For preparation of a hydroxylated polybutadlene having a hydroxylation level of about 14.6%, by the process described in Example B1, a 20 L reactor was initially charged with 1600 g of the epoxidized polybutadiene prepared in Example A8 in 4500 g of isobutanol, and 80 ppmw of trifluoromethanesulfonic acid (based on mass of epoxidized polybutadiene) dissolved in isobutanol (1% solution) was added while stirring. After stirring at 70° C. for 10 hours, the reaction mixture was neutralized at RT with 72 mg of solid NaHCO$_3$ and filtered, and the excess alcohol was distilled off under reduced pressure. 1470 g of a brownish product was obtained, which was admixed with 1000 ppm of Irganox® 1135 and stored under nitrogen.

Evaluation by means of $^{13}$C NMR showed complete conversion of all epoxy groups, which gives a hydroxylation level of about 14.6%.

$M_w$=51 674 g/mol; $M_n$=4081 g/mol; $M_w/M_n$=12.7

Example B7

For preparation of a hydroxylated polybutadiene having a hydroxylation level of about 8,7%, a 2 l reactor, by the method described in Example B1, was initially charged with 720 g of the epoxidized polybutadiene prepared in Example A7 in 720 g of Isobutanol, and 80 ppmw of trfluoromethanesulfonic acid (based on mass of epoxidized polybutadiene) dissolved in isobutanol (1% solution) was added while stirring. After stirring at 70° C. for 7 hours, the reaction mixture was admixed at room temperature with 10 ml of saturated aqueous NaHCO$_3$ solution, and chloroform to clarify the mixture. After stirring for 1.5 hours, the mixture was filtered, and the excess water, alcohol and chloroform were distilled off under reduced pressure. 742 g of a pale yellow product was obtained, which was admixed with 1000 ppm of Irganox® 1135 and stored under nitrogen.

Evaluation by means of $^{13}$C NMR showed complete conversion of all epoxy groups, which results in a hydroxylation level of about 8.7%.

$M_w$=8674 g/mol; $M_n$=2459 g/mol; $M_w/M_n$=3.5

Example B8

For preparation of a hydroxylated polybutadiene having a hydroxylation level of about 60%, by the method described in Example B1, 200 g of the epoxidized polybutadiene prepared in Example A8 was initially charged in 500 g of isobutanol, and 80 ppmw of trifluoromethanesulfonic acid (based on mass of epoxidized polybutadiene) dissolved in isobutanol (1% solution) was added while stirring. After stirring at 70° C. for 6 hours, the reaction mixture was neutralized at RT with 9.0 mg of solid NaHCO$_3$ and filtered, and the excess alcohol was distilled off under reduced pressure. 318 g of a brownish product was obtained, which was admixed with 1000 ppm of Irganox® 1135 and stored under nitrogen.

Evaluation by means of $^{13}$C NMR showed complete conversion of all epoxy groups, which results in a hydroxylation level of about 60%.

$M_w$=3140 g/mol; $M_n$=1264 g/mol; $M_w/M_n$=2.5

Example B9

For preparation of a hydroxylated polybutadiene having a hydroxylation level or about 30%, by the method described in Example B1, 150 g of the epoxidized polybutadiene prepared in Example A9 was initially charged in 375 g of isobutanol, and 80 ppmw of trifluoromethanesulfonic acid (based on mass of epoxidized polybutadiene) dissolved in isobutanol (1% solution) was added while stirring. After stirring at 70° C. for 7 hours, the reaction mixture was neutralized at RT with 6.8 mg of solid NaHCO$_3$ and filtered, and the excess alcohol was distilled off under reduced pressure. 192 g of a brownish product was obtained, which was admixed with 1000 ppm of Irganox® 1135 and stored under nitrogen.

Evaluation by means of $^{13}$C NMR showed complete conversion of all epoxy groups, which results in a hydroxylation level or about 30%.

$M_w$=2972 g/mol; $M_n$=1100 g/mol; $M_w/M_n$=2.7

Step c), Alkoxylation of OH-Functional Polybutadienes Alkoxylations by Means of DMC Catalyst:

Example C1

A 3 litre autoclave was Initially charged with 335 g of the hydroxylated polybutadiene prepared in Example B5 and 0.45 g of zinc hexacyanocobaltate DMC catalyst under nitrogen, and heated up to 130° C. while stirring. The reactor was evacuated down to an internal pressure of 30 mbar in order to remove any volatile ingredients present by distillation. The DMC catalyst was activated by feeding a portion of 41.0 g of propylene oxide. After 15 min and startup of the reaction (drop in internal reactor pressure), a further 144.3 g of propylene oxide was metered in continuously and while cooling within 1 h at 130° C. and max, internal reactor pressure 0.6 bar (absolute). Continued reaction at 130° C. for 30 minutes was followed by degassing. Volatile components such as residual propylene oxide were distilled off under reduced pressure. The product was cooled to below 80° C., and a portion of 165.5 g was discharged. The moderately viscous and orange-coloured, cloudy alkoxylated polybutadiene was admixed with 1000 ppm of Irganox® 1135 and stored under nitrogen.

$M_w$=14 310 g/mol; $M_n$=2698 g/mol; $M_w/M_n$=5.3

The amount remaining in the reactor was heated again to 130° C., and then 126.4 g of propylene oxide was added continuously. After completion of addition and continued reaction for 30 minutes, the mixture was degassed again and a further sample of 171.3 g of product was taken. The moderately viscous and orange-coloured, cloudy alkoxylated polybutadiene was admixed with 1000 ppm of Irganox® 1135 and stored under nitrogen.

$M_w$=13 450 g/mol; $M_n$=3139 g/mol; $M_w/M_n$=4.3

The amount remaining in the reactor was heated again to 130° C., and then 81.0 g of propylene oxide was added continuously. After completion of addition and continued reaction for 30 minutes, the mixture was degassed again and the entire reactor contents of 391.3 g were discharged. The moderately viscous and orange-coloured, cloudy alkoxylated polybutadiene was admixed with 1000 ppm of Irganox® 1135 and stored under nitrogen.

$M_w$=15 430 g/mol; $M_n$=3723 g/mol; $M_w/M_n$=4.1

Example C2

A 3 litre autoclave was initially charged with 211 g of the hydroxylated polybutadiene prepared in Example B5 and 0.26 g of zinc hexacyanocobaltate DMC catalyst under nitrogen, and heated up to 130° C. while stirring. The reactor was evacuated down to an internal pressure of 30 mbar in order to remove any volatile ingredients present by distillation. The DMC catalyst was activated by feeding a portion of 28.0 g of an equimolar mixture of propylene oxide and ethylene oxide. After 20 min and startup of the reaction (drop in internal reactor pressure), a further 74.3 g of the EO/PO mixture was metered in continuously and while cooling within 40 minutes at 130° C. and max, internal reactor pressure 0.6 bar (absolute). Continued reaction at 130° C. for 30 minutes was followed by degassing. Volatile components such as residual propylene oxide and ethylene oxide were distilled off under reduced pressure. The product was cooled to below 80° C., and a portion of 54 g was discharged. The moderately viscous and orange-coloured, cloudy alkoxylated polybutadiene was admixed with 1000 ppm of Irganox® 1135 and stored under nitrogen.

$M_w$=13 690 g/mol; $M_n$=2547 g/mol; $M_w/M_n$=5.4

The amount remaining in the reactor was heated again to 130° C., and then 84.7 g of an equimolar mixture of propylene oxide and ethylene oxide was added continuously. After completion of addition and continued reaction for 30 minutes, the mixture was degassed again and a further sample of 73.1 g of product was taken. The moderately viscous and orange-coloured, cloudy alkoxylated polybutadiene was admixed with 1000 ppm of Irganox® 1135 and stored under nitrogen.

$M_w$=13 110 g/mol; $M_n$=2868 g/mol; $M_w/M_n$=4.6

The amount remaining in the reactor was heated again to 130° C., and then 68.7 g of an equimolar mixture of propylene oxide and ethylene oxide was added continuously. After completion of addition and continued reaction for 30 minutes, the mixture was degassed again and the entire reactor contents of 337.6 g were discharged. The moderately viscous and orange-coloured, cloudy alkoxylated polybutadiene was admixed with 1000 ppm of Irganox® 1135 and stored under nitrogen.

$M_w$=15 190 g/mol; $M_n$=3845 g/mol; $M_w/M_n$=4.0

Alkoxylations by Means of Alkaline Catalysts:

Example C3

A 3 litre autoclave was initially charged with 196.1 g of the hydroxylated polybutadiene prepared in Example B5 and 11.1 g of 30% sodium methoxide solution (30% by weight of sodium methoxide in methanol based on total mass of the solution) under nitrogen, and the mixture was stirred at 50° C. for 1 h. Subsequently, the mixture was heated up to 115° C. while stirring and the reactor was evacuated down to an internal pressure of 30 mbar in order to distillatively remove excess methanol and other volatile ingredients present. 324 g of propylene oxide was metered in continuously and while cooling within 6 h at 115° C. and max, internal reactor pressure 3.5 bar (absolute). Continued reaction at 115° C. for 30 minutes was followed by degassing. Volatile components such as residual propylene oxide were distilled off under reduced pressure. The product was cooled to below 80° C. A portion of 51 g was discharged, and this moderately viscous and orange-coloured, clear alkoxylated polybutadiene was neutralized with lactic acid to an acid number of 0.1 mg KOH/g, admixed with 1000 ppm of Irganox® 1135 and stored under nitrogen.

$M_w$=18 890 g/mol; $M_n$=2888 g/mol; $M_w/M_n$=8.5

The amount remaining in the reactor was heated again to 115° C. and then 216 g of propylene oxide was added continuously. After completion of addition and continued reaction for 30 minutes, the mixture was degassed again, cooled down to 95° C., neutralized with 30% $H_3PO_4$ (30% by weight of $H_3PO_4$ in water based on total mass of the solution), and admixed with 1000 ppm of Irganox® 1135. Water was removed in a vacuum distillation, and precipitated salts were filtered off. 675 g of the clear product having an acid number of 0.1 mg KOH/g was isolated, and was stored under nitrogen.

$M_w$=22 850 g/mol; $M_n$=3160 g/mol; $M_w/M_n$=7.2

Example C4

A 3 litre autoclave was Initially charged with 197.3 g of the hydroxylated polybutadiene prepared in Example B5 and 11.2 g of 30% sodium methoxide solution (30% by weight of sodium methoxide in methanol based on total mass of the solution) under nitrogen, and the mixture was stirred at 50° C. for 1 h. Subsequently, the mixture was heated up to 115° C. while stirring and the reactor was evacuated down to an internal pressure of 30 mbar in order to distillatively remove excess methanol and other volatile ingredients present. 82.5 g of ethylene oxide was metered in continuously and while cooling within 45 minutes at 115° C. and max. Internal reactor pressure 3.5 bar (absolute). Continued reaction at 115° C. for 30 minutes was followed by degassing. Volatile components such as residual ethylene oxide were distilled off under reduced pressure. The product was cooled to below 80° C., and a portion of 49.7 g was discharged. The orange-coloured, clear alkoxylated polybutadiene that was solid at room temperature was neutralized with lactic acid to an acid number of 0.1 mg KOH/g, admixed with 1000 ppm of Irganox® 1135 and stored under nitrogen.
$M_w$=16100 g/mol; $M_n$=2945 g/mol; $M_w/M_n$=5.5

The amount remaining in the reactor was heated again to 115° C. and then 68 g of ethylene oxide was added continuously. After completion of addition and continued reaction for 30 minutes, the mixture was degassed again and cooled down to 95° C. A portion of 59 g was discharged, and this orange-coloured, clear alkoxylated polybutadiene that was solid at room temperature was neutralized with lactic acid to an acid number of 0.1 mg KOH/g, admixed with 1000 ppm of Irganox® 1135 and stored under nitrogen.
$M_w$=17 410 g/mol; $M_n$=3413 g/mol; $M_w/M_n$=5.1

The amount remaining in the reactor was heated again to 115° C., and then 54.4 g of ethylene oxide was added continuously. After completion of addition and continued reaction for 30 minutes, the mixture was degassed again and cooled down to 95° C. The remaining product of 280 g was discharged, and the orange-coloured, clear alkoxylated polybutadiene that was solid at room temperature was neutralized with lactic acid to an acid number of 0.1 mg KOH/g, admixed with 1000 ppm of Irganox® 1135 and stored under nitrogen.
$M_w$=19 000 g/mol; $M_n$=3874 g/mol; $M_w/M_n$=4.9

Example C5

A 3 litre autoclave was initially charged with 194 g of the hydroxylated polybutadiene prepared in Example B5 and 11.0 g of 30% sodium methoxide solution (30% by weight of sodium methoxide in methanol based on total mass of the solution) under nitrogen, and the mixture was stirred at 50° C. for 1 h. Subsequently, the mixture was heated up to 115° C. while stirring and the reactor was evacuated down to an internal pressure of 30 mbar in order to distillatively remove excess methanol and other volatile ingredients present. 94.5 g or ethylene oxide and 53.4 g of propylene oxide were metered in at the same time continuously as a mixture and while cooling within 5.5 hours at 115° C. and max. Internal reactor pressure 3.5 bar (absolute). Continued reaction at 115° C. for 30 minutes was followed by degassing. Volatile components such as residual alkylene oxide were distilled off under reduced pressure. The product was cooled to below 80° C., and a portion of 31.3 g was discharged. The orange-coloured, clear alkoxylated polybutadiene that was liquid at room temperature was neutralized with lactic acid to an acid number of 0.1 mg KOH/g, admixed with 1000 ppm of Irganox® 1135 and stored under nitrogen.
$M_w$=16 230 g/mol; $M_n$=2810 g/mol; $M_w/M_n$=5.8

The amount remaining in the reactor was heated again to 115° C., and then 85.9 g of ethylene oxide and 48.5 g of propylene oxide were added continuously and simultaneously as a mixture. After completion of addition and continued reaction for 30 minutes, the mixture was degassed again and cooled down to 95° C. A portion of 34.3 g was discharged, and this orange-coloured, clear alkoxylated polybutadiene that was liquid at room temperature was neutralized with lactic acid to an acid number of 0.1 mg KOH/g, admixed with 1000 ppm of Irganox® 1135 and stored under nitrogen.
$M_w$=19 160 g/mol; $M_n$=3014 g/mol; $M_w/M_n$=6.4

The amount remaining in the reactor was heated again to 115° C., and then 79.3 g of ethylene oxide and 44.9 g of propylene oxide were added continuously and simultaneously as a mixture. After completion of addition and continued reaction for 30 minutes, the mixture was degassed again, cooled down to 95° C., neutralized with 30% $H_3PO_4$, and admixed with 1000 ppm of Irganox® 1135. Water was removed in a vacuum distillation, and precipitated salts were filtered off. 522 g of the clear product having an acid number of 0.1 mg KOH/g was isolated, and was stored under nitrogen.
$M_w$=24 030 g/mol; $M_n$=3251 g/mol; $M_w/M_n$=7.4

Example C6

A 3 litre autoclave was initially charged with 208 g of the hydroxylated polybutadiene prepared in Example B5 and 4.6 g of solid potassium methoxide under nitrogen, and stirred at 50° C. for 1 h. Subsequently, the mixture was heated up to 115° C. while stirring and the reactor was evacuated down to an internal pressure of 30 mbar in order to distillatively remove volatile ingredients present. 115 g of propylene oxide was metered in continuously and while cooling within 2 hours at 115° C. and max. Internal reactor pressure 3.0 bar (absolute). Continued reaction at 115° C. for 30 minutes was followed by degassing. Volatile components such as residual propylene oxide were distilled off under reduced pressure. The product was cooled to below 80° C., neutralized with lactic acid to an acid number of 0.1 mg KOH/g, and admixed with 1000 ppm of Irganox® 1135. 315 g of the brown, clear alkoxylated polybutadiene that was liquid at room temperature was obtained and stored under nitrogen.
$M_w$=14 350 g/mol; $M_n$=2657 g/mol; $M_w/M_n$=5.4

Example C7

A 3 l autoclave was initially charged with 400 g of the hydroxylated polybutadiene prepared in Example B7 and 20.3 g of 30% sodium methoxide solution (30% by weight of sodium methoxide in methanol based on total mass of the solution) under nitrogen, and the mixture was stirred at 50° C. for 1 h. This was followed by heating to 115° C. while stirring and evacuation of the reactor down to an Internal pressure of 30 mbar, in order to remove excess methanol and other volatile Ingredients present by distillation. Subsequently, 488 g of propylene oxide was metered in continuously and while cooling within 6 hours at 115° C. and max, internal reactor pressure 3.5 bar (absolute). On completion of addition and after further reaction for 30 minutes, the mixture was degassed again and cooled to 95° C., neutralized with 30% $H_3PO_4$ (30% by weight of $H_3PO_4$ in water based on the total mass of the solution) and admixed with 1000 ppm of Irganox® 1135. Water was removed in a vacuum distillation, and precipitated salts were filtered off.

826 g of the reddish-brown, clear product having an acid number of 0.1 mg KOH/g was isolated, and was stored under nitrogen.
$M_w$=14 672 g/mol; $M_n$=2740 g/mol; $M_w/M_n$=5.4

Example C8

A 3 l autoclave was initially charged with 250 g of the hydroxylated polybutadiene prepared in Example B8 and 49.7 g of 30% sodium methoxide solution (30% by weight of sodium methoxide in methanol based on total mass of the solution) under nitrogen, and the mixture was stirred at 50° C. for 1 h. This was followed by heating to 115° C. while stirring and evacuation of the reactor down to an Internal pressure of 30 mbar, in order to remove excess methanol and other volatile ingredients present by distillation. Subsequently, 1202 g of propylene oxide was metered in continuously and while cooling within 10 hours at 115° C. and max. Internal reactor pressure 3.5 bar (absolute). On completion of addition and after further reaction for 30 minutes, the mixture was degassed again and cooled to 95° C., neutralized with 30% $H_3PO_4$ (30% by weight of $H_3PO_4$ in water based on the total mass of the solution) and admixed with 1000 ppm of Irganox® 1135. Water was removed in a vacuum distillation, and precipitated salts were filtered off. 1365 g of the clear product having an acid number of 0.1 mg KOH/g was isolated, and was stored under nitrogen.
$M_w$=11 072 g/mol; $M_n$=2480 g/mol; $M_w/M_n$=4.5

Example C9

A 3 l autoclave was initially charged with 150 g of the hydroxylated polybutadiene prepared in Example B9 and 20.0 g of 30% sodium methoxide solution (30% by weight of sodium methoxide in methanol based on total mass of the solution) under nitrogen, and the mixture was stirred at 50° C. for 1 h. This was followed by heating to 115° C. while stirring and evacuation of the reactor down to an Internal pressure of 30 mbar, in order to remove excess methanol and other volatile Ingredients present by distillation. Subsequently, 484 g of propylene oxide was metered in continuously and while cooling within 6 hours at 115° C. and max. Internal reactor pressure 3.5 bar (absolute). On completion of addition and after further reaction for 30 minutes, the mixture was degassed again and cooled to 95° C., neutralized with 30% $H_3PO_4$ (30% by weight of $H_3PO_4$ in water based on the total mass of the solution) and admixed with 1000 ppm of Irganox® 1135. Water was removed in a vacuum distillation, and precipitated salts were filtered off. 599 g of the clear product having an acid number of 0.1 mg KOH/g was isolated, and was stored under nitrogen.
$M_w$=8914 g/mol; $M_n$=2073 g/mol; $M_w/M_n$=4.3

Step e), Aftertreatment for Colour Lightening
Colour Lightening by Addition of Activated Carbon:

Example E1

In a 100 ml one-neck flask. 20 g of the alkoxylated polybutadiene prepared in Example C7 (Gardner colour number: 4.3) was admixed with 10 ml of chloroform and 1 g of activated carbon (Norit SX 1). After stirring at room temperature for 2 hours, the activated carbon was filtered off and the excess solvent was removed under reduced pressure. 19 g of the lighter-coloured alkoxylated polybutadiene was Isolated.
Gardner colour number: 2.1
Colour Lightening by Addition of Hydrogen Peroxide:

Example E2

In a 100 ml one-neck flask with reflux condenser, 20 g of the alkoxylated polybutadiene prepared in Example C7 (Gardner colour number: 4.3) was equilibrated to 80° C. and admixed with 5% by weight of 30% hydrogen peroxide solution (30% by weight of $H_2O_2$ based on the total mass of the aqueous solution). The mixture was stirred at 80° C. for 2 hours, and water and excess hydrogen peroxide were then distilled off under full vacuum. 20 g of the lighter-coloured product was isolated (Gardner colour number 1.8).

The invention claimed is:

1. A process for preparing one or more polyether-modified polybutadienes, comprising:
   a) reacting at least one polybutadiene (A) with at least one epoxidizing reagent (B) to give at least one epoxy-functional polybutadiene (C);
   b) reacting the at least one epoxy-functional polybutadiene (C) with at least one hydroxy-functional compound (D) to give at least one hydroxy-functional polybutadiene (E); and
   c) reacting the at least one hydroxy-functional polybutadiene (E) with at least one epoxy-functional compound (F) to give at least one polyether-modified polybutadiene (G);
   wherein the reacting in b) is an addition reaction of the at least one hydroxy-functional compound (D) onto the at least one epoxy-functional polybutadiene (C), and said at least one hydroxy-functional compound (D) is at least one compound selected from the group consisting of a mono-alcohol, a carboxylic acid or water.

2. The process according to claim 1, further comprising:
   d) reacting the at least one polyether-modified polybutadiene (G) with at least one end-capping reagent (H) to give at least one polyether-modified polybutadiene (K) containing end-capped polyether radicals.

3. The process according to claim 2, further comprising:
   e) lightening a colour of the at least one polyether-modified polybutadiene (G) or the at least one polyether-modified polybutadiene (K).

4. The process according to claim 1, wherein the at least one polybutadiene (A) has double bonds which are 0% to 80% 1,2-vinyl double bonds and 20% to 100% 1,4-double bonds.

5. The process according to claim 1, wherein a number-average molar mass $M_n$ of the at least one polybutadiene (A) is from 200 g/mol to 20,000 g/mol.

6. The process according to claim 1, wherein >0% to 70% of double bonds of the at least one polybutadiene (A) are epoxidized.

7. The process according to claim 1, wherein the at least one epoxidizing reagent (B) contains performic acid.

8. The process according to claim 1, wherein the at least one hydroxy-functional compound (D) is at least one mono-functional alcohol having 1 to 6 carbon atoms.

9. The process according to claim 1, wherein in b), a total number of hydroxyl groups in the at least one hydroxy-functional compound (D) to a total number of epoxy groups in the at least one epoxy-functional polybutadiene (C) is from >1:1 to 50:1.

10. The process according to claim 1, wherein in b), an acid is used as a catalyst.

11. The process according to claim 1, wherein the at least one epoxy-functional compound (F) used in c) is selected from the group consisting of an alkylene oxide having 2 to 18 carbon atoms, a glycidyl compound, and a mixture thereof.

12. The process according to claim 1, wherein c) further includes an alkoxylation catalyst.

13. The at least one polyether-modified polybutadiene (G), obtained by the process according to claim 1, wherein the at least one hydroxy-functional compound (D) is a mono-alcohol or a carboxylic acid.

14. A polyether-modified polybutadiene, comprising repeat units selected from the group consisting of divalent radicals

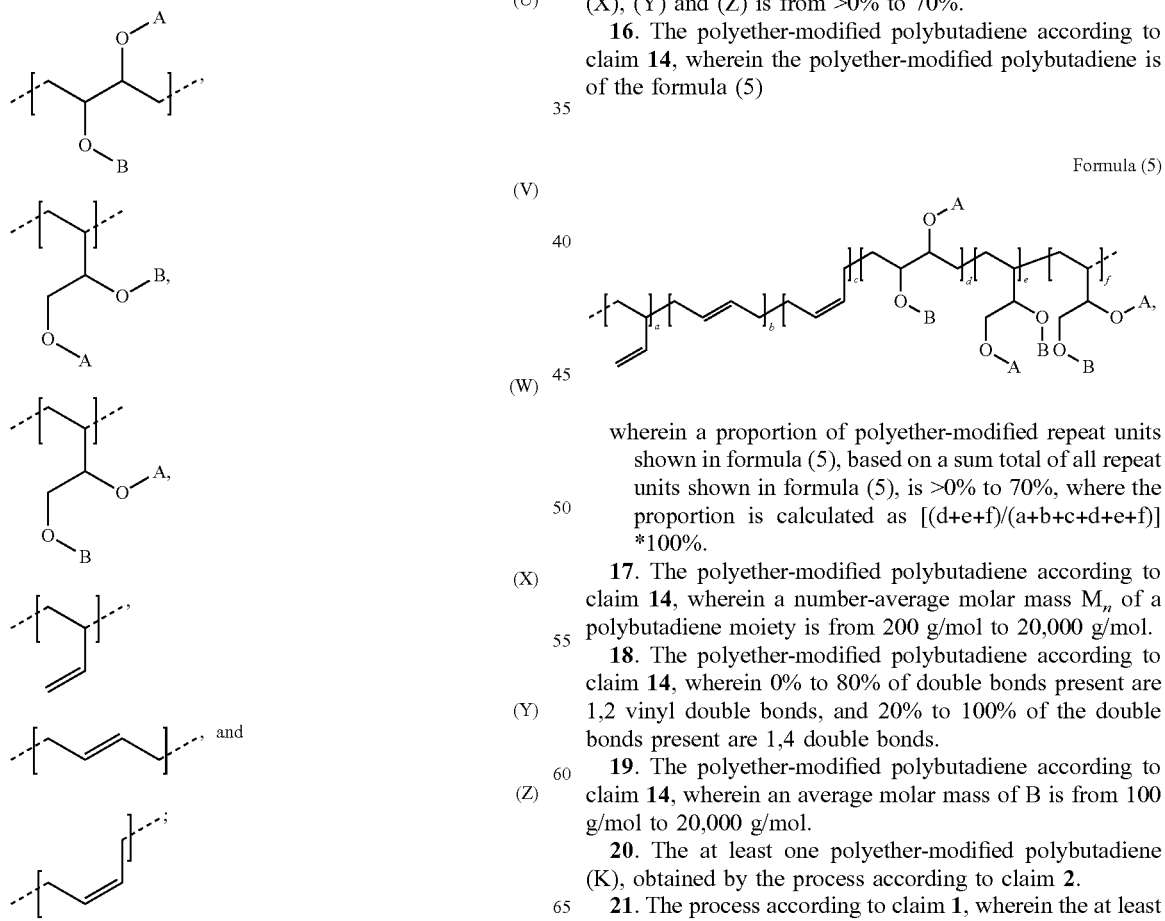

wherein

OA is in each case independently derived from a mono-alcohol HO—A or —O— acyl,

B is in each case independently a radical of the formula (4a)

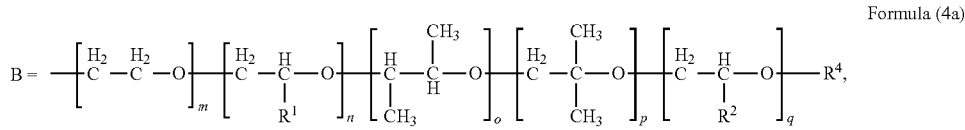

Formula (4a)

$R^1$ is in each case independently a monovalent hydrocarbon radical having 1 to 16 carbon atoms, $R^2$ is a radical of the formula —$CH_2$—O—$R^3$;

$R^3$ is in each case independently a monovalent hydrocarbon radical having 3 to 18 carbon atoms;

$R^4$ is in each case independently a monovalent organic radical having 1 to 18 carbon atoms or hydrogen; and m, n, o, p and q are each independently 0 to 300, with the proviso that the sum total of m, n, o, p and q is greater than 1;

for every permutation of the repeat units (U), (V), (W), (X), (Y) and (Z) and of repeat units in B.

15. The polyether-modified polybutadiene according to claim 14, wherein a sum total of all repeat units (U), (V) and (W) divided by a sum total of all repeat units (U), (V), (W), (X), (Y) and (Z) is from >0% to 70%.

16. The polyether-modified polybutadiene according to claim 14, wherein the polyether-modified polybutadiene is of the formula (5)

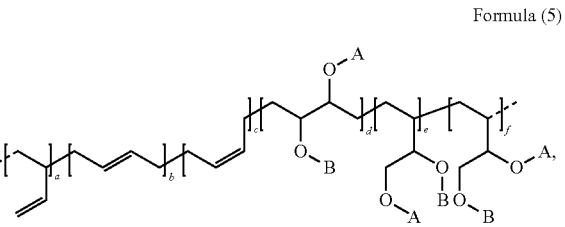

Formula (5)

wherein a proportion of polyether-modified repeat units shown in formula (5), based on a sum total of all repeat units shown in formula (5), is >0% to 70%, where the proportion is calculated as [(d+e+f)/(a+b+c+d+e+f)]*100%.

17. The polyether-modified polybutadiene according to claim 14, wherein a number-average molar mass $M_n$ of a polybutadiene moiety is from 200 g/mol to 20,000 g/mol.

18. The polyether-modified polybutadiene according to claim 14, wherein 0% to 80% of double bonds present are 1,2 vinyl double bonds, and 20% to 100% of the double bonds present are 1,4 double bonds.

19. The polyether-modified polybutadiene according to claim 14, wherein an average molar mass of B is from 100 g/mol to 20,000 g/mol.

20. The at least one polyether-modified polybutadiene (K), obtained by the process according to claim 2.

21. The process according to claim 1, wherein the at least one polyether-modified polybutadiene (G) is a linear polybutadiene with pendant polyether radicals.

22. The process according to claim 1, wherein the process is performed without an organolithium compound.

23. The polyether-modified poly butadiene according to claim 14, wherein —OA is derived from a mono-alcohol with 1 to 6 carbon atoms.

* * * * *

UNITED STATES PATENT AND TRADEMARK OFFICE
CERTIFICATE OF CORRECTION

PATENT NO. : 12,139,561 B2
APPLICATION NO. : 17/756423
DATED : November 12, 2024
INVENTOR(S) : Schubert et al.

Page 1 of 1

It is certified that error appears in the above-identified patent and that said Letters Patent is hereby corrected as shown below:

On the Title Page

Column 2, Line 7, in OTHER PUBLICATIONS currently reads:
"Physics."
And should read:
--Physics,--; and In the Claims Column 37, Line 3, Claim 23, currently reads:
"poly butadiene"
And should read:
--polybutadiene--.

Signed and Sealed this
Twenty-fourth Day of June, 2025

Coke Morgan Stewart
*Acting Director of the United States Patent and Trademark Office*